US010757596B2

(12) United States Patent
Akdeniz et al.

(10) Patent No.: US 10,757,596 B2
(45) Date of Patent: Aug. 25, 2020

(54) METHODS AND APPARATUS TO COLLECT DATA FROM USER EQUIPMENT OUTSIDE A NETWORK

(71) Applicant: Intel Corporation, Santa Clara, CA (US)

(72) Inventors: Mustafa Akdeniz, San Jose, CA (US); Shu-ping Yeh, Campbell, CA (US); Nageen Himayat, Fremont, CA (US); Nikita Tafintsev, Tampere (FI); Mikhail Gerasimenko, Tampere (FI); Sergey Andreev, Tampere (FI); Yevgeni Koucheryavy, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/370,272

(22) Filed: Mar. 29, 2019

(65) Prior Publication Data
US 2019/0230548 A1    Jul. 25, 2019

Related U.S. Application Data

(60) Provisional application No. 62/692,474, filed on Jun. 29, 2018.

(51) Int. Cl.
H04W 24/10    (2009.01)
H04W 8/00    (2009.01)
(Continued)

(52) U.S. Cl.
CPC .......... H04W 24/10 (2013.01); G05D 1/0022 (2013.01); G05D 1/0094 (2013.01);
(Continued)

(58) Field of Classification Search
CPC .... G05D 1/0022; G05D 1/0094; G05D 1/101; H04W 16/26; H04W 24/02; H04W 24/10; H04W 64/003; H04W 8/005
(Continued)

(56) References Cited

U.S. PATENT DOCUMENTS 9,788,260 B2 * 10/2017 Dowlatkhah ......... H04W 8/005
9,866,313 B1 *  1/2018 Murphy ............. H04B 7/18504
(Continued)

OTHER PUBLICATIONS

Fotouhi, Azade et al., "Dynamic Base Station Repositioning to Improve Spectral Efficiency of Drone Small Cells", University of New South Wales, Sydney, Australia, Apr. 5, 2017, 9 pages.
(Continued)

Primary Examiner — Tan H Trinh
(74) Attorney, Agent, or Firm — Hanley, Flight & Zimmerman, LLC

(57) ABSTRACT

Methods, apparatus, systems and articles of manufacture are disclosed provide an apparatus comprising a data manager to transmit a first signal to a discovery drone, the first signal to cause the discovery drone to discover user equipment in an environment, the user equipment outside of a first network including a first drone; and collect one or more values corresponding to the user equipment; a utility function determiner to, in response to a trigger event corresponding to the one or more values, determine a first position of the first drone in the environment; and a navigation dispatcher to transmit a second signal to the first drone, the second signal to cause the first drone to regulate the first position to establish one or more connections between the user equipment and the first network.

25 Claims, 13 Drawing Sheets

(51) Int. Cl.
*H04W 16/26* (2009.01)
*H04W 24/02* (2009.01)
*H04W 64/00* (2009.01)
*G05D 1/00* (2006.01)
*G05D 1/10* (2006.01)
*H04W 84/06* (2009.01)
*H04W 88/06* (2009.01)

(52) U.S. Cl.
CPC ............ *G05D 1/101* (2013.01); *H04W 8/005* (2013.01); *H04W 16/26* (2013.01); *H04W 24/02* (2013.01); *H04W 64/003* (2013.01); *H04W 84/06* (2013.01); *H04W 88/06* (2013.01)

(58) Field of Classification Search
USPC .......... 455/69, 522, 41.1, 41.2, 67.11, 67.16, 455/552.1; 725/34; 1/1
See application file for complete search history.

(56) References Cited

U.S. PATENT DOCUMENTS

| | | | | |
|---|---|---|---|---|
| 10,168,695 | B2* | 1/2019 | Barnickel | H04B 7/18506 |
| 10,419,903 | B2* | 9/2019 | Singh | H04L 43/16 |
| 2014/0302784 | A1* | 10/2014 | Kim | H04W 8/005 |
| | | | | 455/41.2 |
| 2016/0073171 | A1* | 3/2016 | Wessel | H04N 21/4882 |
| | | | | 725/34 |
| 2017/0227965 | A1* | 8/2017 | Decenzo | H04L 67/025 |
| 2017/0242431 | A1* | 8/2017 | Dowlatkhah | G08C 17/02 |
| 2018/0033312 | A1* | 2/2018 | DeLuca | G08G 5/0008 |
| 2018/0288713 | A1* | 10/2018 | Kosseifi | H04W 52/281 |
| 2018/0293898 | A1* | 10/2018 | Redmann | G08G 5/0013 |
| 2018/0317067 | A1* | 11/2018 | Ameixieira | H04W 4/46 |
| 2018/0324548 | A1* | 11/2018 | Venkatraman | H04W 4/023 |
| 2019/0025820 | A1* | 1/2019 | Ferguson | G08G 1/143 |
| 2019/0066504 | A1* | 2/2019 | Zaloom | G08G 1/144 |
| 2019/0260768 | A1* | 8/2019 | Mestha | H04L 63/1416 |
| 2019/0289445 | A1* | 9/2019 | Wang | H04W 8/22 |
| 2019/0306835 | A1* | 10/2019 | Hoang | H04W 72/082 |

OTHER PUBLICATIONS

Zhang, Qian Sai et al., "InferBeam: A Fast Beam Alignment Protocol for Millimeter-wave Networking", Harvard University, Mar. 5, 2018, 12 pages.

Brodkin, Jon, "An AT&T Drone Is Now Providing Cellular Service to People in Puerto Rico", published on Nov. 6, 2017, accessed on Jan. 16, 2018, https://arstechnica.com/information-technology/2017/11/att-drone-brings-lte-access-to-hurricane-damaged-puerto-rico/, 5 pages.

Kalantari, Elham et al., "On the Number and 3D Placement of Drone Base Stations in Wireless Cellular Networks", University of Ottawa and Carleton University, presented on Sep. 18-21, 2016, 21 pages.

* cited by examiner

METHODS AND APPARATUS TO COLLECT DATA FROM USER EQUIPMENT OUTSIDE A NETWORK

RELATED APPLICATION

This patent claims the benefit of U.S. Provisional Application Ser. No. 62/692,474, which was filed on Jun. 29, 2018. U.S. Provisional Application Ser. No. 62/692,474 is hereby incorporated herein by reference in its entirety. Priority to U.S. Provisional Application Ser. No. 62/692,474 is hereby claimed.

FIELD OF THE DISCLOSURE

This disclosure relates generally to drone swarms, and, more particularly, to methods and apparatus to collect data from user equipment outside a network.

BACKGROUND

Unmanned aerial vehicles (UAVs), such as drones, are aircrafts that receive or generate navigational paths to travel from a first location to a second location without a pilot on board. Drones have sophisticated on-board systems that allow the drones to travel autonomously and/or via remote control. Recently, drones have increased in popularity expanding from military application to commercial, recreational, and other applications.

BRIEF DESCRIPTION OF THE DRAWINGS

The figures are not to scale. In general, the same reference numbers will be used throughout the drawing(s) and accompanying written description to refer to the same or like parts.

Figure 1:
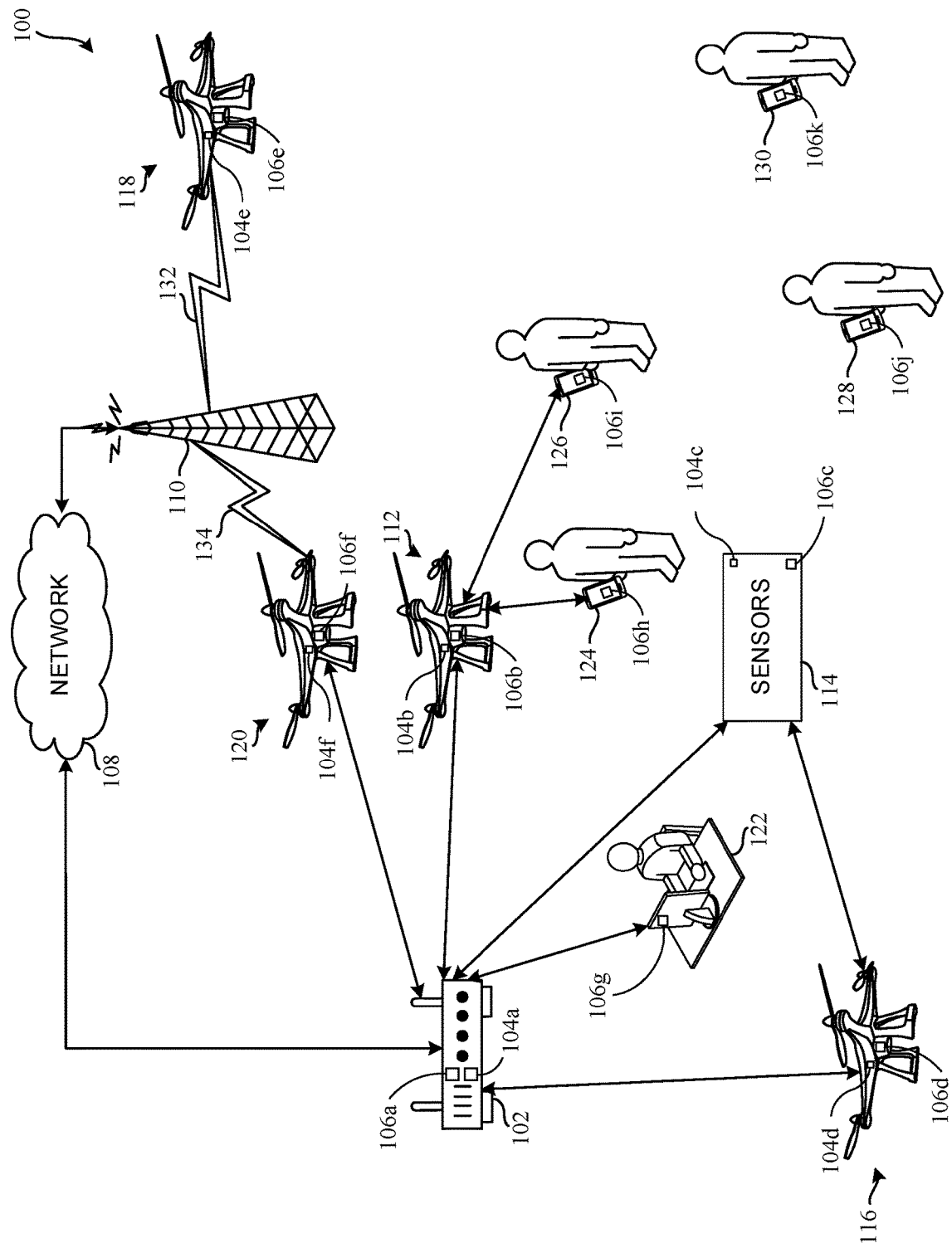
FIG. 1 is an illustration of an example environment including an example control center, an example network, an example base station, an example initiator node, an example sensor node, an example measurement collection node, an example access drone, an example discovery drone.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Unmanned aerial vehicles, such as drones, have recently increased in popularity with the decrease in the price of such aerial vehicles. Although drones were originally designed for military applications, the application of drones has expanded to wireless coverage, surveillance, tracking, photography, agriculture, racing, delivery, and various other applications. Drones may be controlled by instructions from a base station, by a user using a remote control, and/or autonomously via on-board computers.

Drones are equipped with sensors (e.g., imaging sensors, audio sensors, radio detecting and ranging (RADAR) sensors, light detecting and ranging (LIDAR) sensors, sound detecting and ranging (SONAR) sensors, etc.) that capture image and/or audio data to help the drones navigate around obstacles during autonomous and/or semi-autonomous flight. Additionally, drones are equipped with radio architecture (e.g., long term evolution (LTE) radio access technology (RAT), Universal Mobile Telecommunications System (UMTS) RAT, Global System for Mobile communication (GSM) RAT, Enhanced Data Rates for GSM (EDGE) RAT, wireless local area networking (Wi-Fi) RAT, millimeter wave (mmWave) RAT). The radio architecture included in the drones may be implemented by a single physical layer (PHY), a combination of similar PHY, a combination of different PHY, or any combination of similar and different PHY. Additionally, drones are equipped with sensors (e.g., positioning sensors) to identify the position and/or location (e.g., global positioning system coordinates) of the drone and/or communication sensors (e.g., Wi-Fi sensors, Bluetooth sensors, cellular communication sensors, etc.) to communicate with external devices. As used herein, autonomous flight includes autonomous control of the flight and/or movement of a vehicle using on-board controllers (e.g., without instructions from a remote device). As used herein, semi-autonomous flight includes instructions from a remote device that are executed by on-board controllers to execute the instructions, thereby combining user interaction with on-board automation. For example, an instruction to a drone may be to increase altitude to a first height and the on-board controllers may control the electrical and mechanical components of the drone to increase the altitude to the first height. As used herein, manual flight is user control of the electrical and/or mechanical components of the drone to control the flight pattern of the drone.

As the popularity of drones has increased, many developers have designed drones to be used in a variety of applications. Some drones are designed to be used in other applications while others are designed for specific applications such as wireless network access, wildlife monitoring, environmental studies, and surveillance. In a wireless network access application, developers have designed drones to be used as wireless control centers (APs). These AP enabled drones can be used to set up wireless networks in areas/environments in which a temporary event (e.g., a concert, festival, county fair, sporting event, etc.) is taking place or in which a natural disaster (e.g., hurricane, tornado, wildfire, earthquake, etc.) has taken place. Multiple AP enables drones are used together as a drone swarm to set up a wireless network. When using AP enabled drones to set up a wireless network, optimization of the wireless network is important to ensure effective wireless coverage is provided to the clients in the wireless network.

A problem that arises when optimizing a wireless network of AP enable drones is that clients (e.g., user equipment (UE)) may be mobile. For example, mobile UEs can enter and/or exit the coverage space of different AP enabled drones in the drone swarm. The movement of different clients in a wireless network provided by a drone swarm can reduce the effectiveness of the wireless network implemented by the drone swarm. Common approaches for optimizing a drone swarm include using static locations of UEs, no feedback path for network values, and no method, apparatus, or system to account for changing demand between different AP enabled drones in a drone swarm.

While common approaches for optimizing a drone swarm providing a wireless network do not include these elements, the examples disclosed herein provide a data collector to transmit a first signal to an initiating node, the first signal to cause the initiating node to transmit a second signal to a discovery node, the second signal to cause a discovery of user equipment in a network; and collect one or more metric values corresponding to one or more of the initiating node, the discovery node, and the user equipment; a utility function determiner to, in response to a trigger event corresponding to the one or more metric values, optimize an organization of a first drone and a second drone; and a navigation dispatcher to transmit a third signal to the first drone and the second drone, the first drone and the second drone forming the network, the third signal to cause the first drone and the second drone to change the organization of the first drone and second drone to optimize one or more connections between the user equipment and the network.

Examples disclosed herein provide a framework to facilitate network communication for user equipment not currently connected to a network. Examples disclosed herein provide an apparatus comprising a data manager to transmit a first signal to a discovery drone, the first signal to cause the discovery drone to discover user equipment in an environment, the user equipment outside of a first network including a first drone; and collect one or more values corresponding to the user equipment; a utility function determiner to, in response to a trigger event corresponding to the one or more values, determine a first position of the first drone in the environment; and a navigation dispatcher to transmit a second signal to the first drone, the second signal to cause the first drone to regulate the first position to establish one or more connections between the user equipment and the first network.

FIG. 1 is an illustration of an example environment 100 including an example control center 102, an example network 108, an example base station 110, an example initiator node 112, an example sensor node 114, an example measurement collection node 116, an example access drone 118, an example discovery drone 120, an example first user equipment 122, an example second user equipment 124, an example third user equipment 126, an example fourth user equipment 128, and an example fifth user equipment 130.

In the illustrated example of FIG. 1, the example control center 102 includes an example drone swarm controller 104a and an example radio architecture 106a. The example initiator node 112 includes an example drone swarm controller 104b and an example radio architecture 106b. The example sensor node 114 includes an example drone swarm controller 104c and an example radio architecture 106c. The example measurement collection node 116 includes an example drone swarm controller 104d and an example radio architecture 106d. The example access drone 118 includes an example drone swarm controller 104e and an example radio architecture 106e. The example discovery drone 120 includes an example drone swarm controller 104f and an example radio architecture 106f.

While the example of FIG. 1, includes the example drone swarm controller 104a, the example drone swarm controller 104b, the example drone swarm controller 104c, the example drone swarm controller 104d, the example drone swarm controller 104e, and the example drone swarm controller 104f to control the nodes and/or drones in the example environment 100 in a wireless network, the example drone swarm controller 104a, the example drone swarm controller 104b, the example drone swarm controller 104c, the example drone swarm controller 104d, the example drone swarm controller 104e, and the example drone swarm controller 104f may be described in conjunction with other environments (e.g., wildlife monitoring, environmental studies, and surveillance).

In the illustrated example of FIG. 1, the example first user equipment 122 includes an example radio architecture 106g. The example second user equipment 124 includes an example radio architecture 106h. The example third user equipment 126 includes an example radio architecture 106i. The example fourth user equipment 128 includes an example radio architecture 106j. The example fifth user equipment includes an example radio architecture 106k.

In the illustrated example of FIG. 1, the example control center 102 is communicatively coupled to the example network 108, the example initiator node 112, the example sensor node 114, the example measurement collection node 116, the example discovery drone 120, and the example first user equipment 122. The example initiator node 112 is communicatively coupled to the example control center 102, the example second user equipment 124, and the example third user equipment 126. The example sensor node 114 is communicatively coupled to the example control center 102 and the example measurement collection node 116. The example measurement collection node 116 is communicatively coupled to the example sensor node 114 and the example control center 102. The example access drone 118 is communicatively coupled to the example base station 110 via an example first communication link 132. The example discovery drone 120 is communicatively coupled to the example control center 102. The example discovery drone 120 is also communicatively coupled to the example base station 110 via an example second communication link 134.

In the illustrated example, the example first communication link 132 and the example second communication link 134 are communication channels that connect the example access drone 118, the example discovery drone 120, and the example base station 110 to one another. In the illustrated example, the first communication link 132 and the second communication link 134 use communication channels that are based on the example radio architecture 106e and the example radio architecture 106f. In such an example, the radio architecture 106e and the example radio architecture 106f implement RAT (e.g., LTE, UMTS, GSM, EDGE, etc.) that can communicate directly with the example base station 110 to communicate with the example network 108. In other examples, the communicative coupling between the example control center 102, the example network 108, the example base station 110, the example initiator node 112, the example sensor node 114, the example measurement collection node 116, the example access drone 118, the example discovery drone 120, the example first user equipment 122, the example second user equipment 124, and the example third user equipment 126 may be any combination of radio architecture capable of communicating directly with the example base station 110 to communicate with the example network 108 (e.g., radio architecture 106e, 106f, etc.) and radio architecture capable of communicating with the example network 108 via other network interfaces (e.g., routers, modems, network links, etc.) (e.g., radio architecture 106b, 106c, 106d, 106g, etc.).

In the illustrated example of FIG. 1, the example control center 102 is a device that is communicatively coupled to at least the example network 108, the example initiator node 112, the example sensor node 114, the example measurement collection node 116, the example access drone 118, and the example first user equipment 122. In the example, the control center 102 allows the initiator node 112, sensor node 114, measurement collection node 116, the discovery drone 120, and the example first user equipment 122 to access wirelessly the example network 108. In the illustrated example of FIG. 1, the control center 102 is a device that generates a wireless network (e.g., a wireless local area network (WLAN), a wireless personal area network (WPAN), a wireless wide area network (WWAN), etc.) in an environment (e.g., a concert setting, an emergency setting, a festival, a fair etc.). In the example, the control center 102 allows the initiator node 112, sensor node 114, measurement collection node 116, the discovery drone 120, and the example first user equipment 122 to access wirelessly the example network 108. In other examples, the control center 102 is a drone that has the capability of an access point and/or radio architecture that can communicate with other devices in the environment (e.g., radio architecture 106a). In further examples, the control center 102 is a combination of a modem and a router, a network switch, an ethernet hub, or any other device that provides a wireless connection from the initiator node 112, sensor node 114, measurement collection node 116, the discovery drone 120, and the example first user equipment 122 to the network 108. In the example, the control center 102 is a router, and the control center 102 accesses the network 108 through a wire connection via a modem.

In the illustrated example of FIG. 1, the example control center 102 includes the example drone swarm controller 104a. The example drone swarm controller 104a is a device that controls the nodes and/or drones in the example environment 100. The example drone swarm controller 104a collects one or more values from the example initiator node 112, the example sensor node 114, the example measurement collection node 116, the example access drone 118, the example discovery drone 120, the example first user equipment 122, the example second user equipment 124, the example third user equipment 126, other nodes, drones, or user equipment in the environment 100 to regulate the location of the nodes and drones in the environment to supply a wireless network to the example first user equipment 122, the example second user equipment 124, the example third user equipment 126, and other nodes, drones, or user equipment in the environment 100 in need of a wireless network. In other examples, any of the drone swarm controller 104a, the drone swarm controller 104b, the drone swarm controller 104c, the drone swarm controller 104d, the drone swarm controller 104e, and the drone swarm controller 104f may perform the control of the drone swarm controller 104a. In the illustrated example of FIG. 1, the drone swarm controller 104a transmits a signal to any of the example initiator node 112, the example sensor node 114, the example measurement collection node 116, the example access drone 118, the example discovery drone 120, the example first user equipment 122, or any other device communicatively coupled to the example drone swarm controller 104a (e.g., the control center 102). The signal includes one or more of an identifier of the drone swarm controller 104a, an identifier of one or more measurement collection nodes (e.g., the example measurement collection node 116), or a position of the example drone swarm controller 104a in the environment 100.

In the illustrated example of FIG. 1, the example network 108 is the Internet. In other examples, the network 108 is a digital telecommunications network that allows nodes, drones, or user equipment connected to the example network 108 to share resources that is suitable to the application. For example, an example network 108 facilitates the transmission of data between different nodes, drones, or user equipment connected to the example network 108. In the illustrated example of FIG. 1, the example base station 110 is a device that facilitates wireless communication between nodes, drones, user equipment, or other devices and a network (e.g., the network 108).

In the illustrated example of FIG. 1, the example initiator node 112 is a drone. In other examples, the initiator node 112 is a combination of other nodes, drones, or the control center 102. For example, the initiator node 112 is any node that initiates acquisition of the one or more values in response to a signal from the example drone swarm controller 104a. In the illustrated example, the example initiator node 112 is also providing the network 108 to the example second user equipment 124 and the example third user equipment 126.

In the illustrated example of FIG. 1, the example sensor node 114 is a static sensor that collects one or more values from the example environment 100. For example, the example sensor node 114 is a camera with wireless connectivity. In other examples, the sensor node 114 is a RADAR sensor, a LIDAR sensor, a SONAR sensor, or any other sensor that is suitable to the application. In further examples, the example sensor node 114 is a built-in sensor on user equipment (e.g., the example first user equipment 122, the example second user equipment 124, etc.). In some examples, the example sensor node 114 is native to a drone. In such examples, the example sensor node 114 is mobile.

In the illustrated example of FIG. 1, the example measurement collection node 116 is a drone. In other examples, the measurement collection node 116 is a combination of other nodes, drones, or the control center 102. For example, the measurement collection node 116 is any node that the example sensor node 114 connects to, in response to the query from the initiator node 112, to transmit the requested values to. In such an example, the initiator node 112 receives a signal from the drone swarm controller 104a to query the sensor node 114, the signal from the drone swarm controller 104a also causes the initiator node 112 to transmit in the query information regarding one or more measurement collection nodes (e.g., the example measurement collection node 116). In response to this information, if the sensor node 114 cannot transmit the requested values back to the initiator node 112 (e.g., due to limited transmission power of the sensor node 114, due to the type of radio architecture 106c of the sensor node 114, etc.).

In the illustrated example of FIG. 1, the example access drone 118 is a drone including radio architecture 106e that is capable of operating as an access point. For example, the example access drone 118 is a drone including radio architecture 106e that operates on LTE RAT and Wi-Fi RAT. In such an example the access drone 118 provides a wireless network (e.g., the network 108) to user equipment, nodes, or other drones that are communicatively coupled to the access drone 118. Moreover, the access drone 118 communicates with the example network 108 via the example base station 110. Any user equipment, nodes, and/or drones that are communicatively coupled to the example access drone 118 communicate with the access drone 118 via Wi-Fi capable RAT. In such an example, the example access drone 118 relays communication from user equipment, nodes, and/or drones communicatively coupled to the example access drone 118 to the example base station 110. By relaying communications between user equipment, nodes, and/or drones, the example access drone 118 provides a network (e.g., the network 108) to the user equipment, nodes, and/or drones. In further examples, the example access drone 118 is a combination of a modem and a router, a network switch, an ethernet hub, or any other device that is capable of providing a wireless network to the initiator node 112, sensor node 114, measurement collection node 116, the discovery drone 120, and the example first user equipment 122, the example second user equipment 124, the example third user equipment 126, the example fourth user equipment 128, and the example fifth user equipment 130 to the network 108. Access drones, such as the example access drone 118, have a limited area in which the access drone can be positioned in an environment. That is, once an access drone (e.g., the example access drone 118) is providing a network (e.g., the example network 108) to user equipment (e.g., the example fourth user equipment 128), nodes, and/or drones, the access drone (e.g., the access drone 118) operates within a distance on the user equipment, nodes, and/or drones based on one or more connections between the user equipment, nodes, and/or drones communicatively coupled to the access drone (e.g., the example access drone 118).

In the illustrated example of FIG. 1, the example discovery drone 120 is a drone including radio architecture 106f that is capable of at least communicating with the example network 108 via the example base station 110. In the illustrated example, a discovery drone (e.g., the example discovery drone 120) is a drone that discovers user equipment, nodes, and/or other equipment in an environment (e.g., the environment 100). In some examples, the example discovery drone 120 is a drone that is dedicated to discovery functionality. That is, the example discovery drone 120 is a drone that, in response to a signal from the drone swarm controller 104a navigates throughout the environment 100, query user equipment, nodes, and/or equipment in the environment 100 via a discovery signal, and transmit a second signal to the example drone swarm controller 104a, the second signal including the one or more values, an identifier of the example discovery drone 120, and a position of the example discovery drone 120 in the example environment 100. The discovery signal is a signal that includes one or more of a request for one or more values, an identifier of the example drone swarm controller 104a, an identifier of the example discovery drone 120, an identifier of user equipment, nodes, and/or other equipment, an identifier of one or more measurement collection nodes (e.g., the measurement collection node 116), a transmission power associated with the discovery signal, a position of the example drone swarm controller 104a in the example environment 100, and a position of the example discovery drone 120 in the environment 100. In the illustrated example of FIG. 1, an identifier may be the IP address, MAC address, or any other effective identifier for an application. In other examples, the discovery drone 120 could be an access drone (e.g., the example access drone 118) that can navigate throughout the example environment 100 and discovery user equipment, other nodes, and/or drones in the environment 100.

In the illustrated example of FIG. 1, the example environment 100 includes the example first user equipment 122, the example second user equipment 124, the example third user equipment 126, the example fourth user equipment 128, and the example fifth user equipment 130. In the illustrated example, the example first user equipment 122 is a desktop computer. In the illustrated example, the example second user equipment 124, the example third user equipment 126, the example fourth user equipment 128, and the example fifth user equipment 130 are mobile telephones. In other examples, the example first user equipment 122, the example second user equipment 124, the example third user equipment 126, the example fourth user equipment 128, and the example fifth user equipment 130 may be any device that is used by an end user to communicate using (e.g., access) the example network 108. For example, one or more of the example first user equipment 122, the example second user equipment 124, the example third user equipment 126, the example fourth user equipment 128, and the example fifth user equipment 130 may be a mobile telephone, a desktop computer, a laptop computer, a smart watch, and/or any other device that is network capable.

In operation, the example drone swarm controller 104a sends a first signal to the initiator node 112, the example sensor node 114, and the example discovery drone 120. The first signal includes an identifier of the example drone swarm controller 104a, an identifier of one or more measurement collection nodes (e.g., the example measurement collection node 116), and a position of the example drone swarm controller 104a in the environment 100. In response to the first signal, the example initiator node 112, the example sensor node 114, and the example discovery drone 120 start a discovery process in the environment 100. For example, the example initiator node 112 queries the example second user equipment 124 and the example third user equipment 126 for one or more values via a discovery signal; the example sensor node 114 senses one or more values from the example first user equipment 122, the example second user equipment 124, the example third user equipment 126, the example fourth user equipment 128, and the example fifth user equipment 130; and the example discovery drone 120 queries the example first user equipment 122, the example second user equipment 124, the example third user equipment 126, the example fourth user equipment 128, and the example fifth user equipment 130 for one or more values via a discovery signal. For example, the one or more values include an identifier of the user equipment (e.g., the first user equipment 122, the second user equipment 124, etc.), a position of the user equipment in the environment 100, a status of connection between the user equipment and a network (e.g., the example network 108, a second network different from the example network 108, etc.), a timestamp associated with the one or more values, a signal strength associated with the connection between the user equipment and a network, a signal-to-noise ratio (SNR) associated with the connection between the user equipment and a network, and a pathloss associated with the connection between the user equipment and a network. The example drone swarm controller 104a also transmits a signal to the example first user equipment 122 to collect the one or more values.

In operation, the first signal transmitted from the example drone swarm controller 104a to the example initiator node 112 causes the example initiator node 112 to, in response to obtaining the one or more values from the example second user equipment 124 and the example third user equipment 126, transmit a second signal to the example drone swarm controller 104a, the second signal including the one or more values, an identifier of the example initiator node 112, and a position of the initiator node 112 in the environment 100.

In operation, the first signal transmitted from the example drone swarm controller 104a to the example sensor node 114 causes the example sensor node 114 to, in response to obtaining the one or more values from the example first user equipment 122, the example second user equipment 124, the example third user equipment 126, the example fourth user equipment 128, and the example fifth user equipment 130, transmit a third signal to the example measurement collection node 116, the third signal including the one or more values, an identifier of the example sensor node 114, a position of the example sensor node 114 in the environment 100.

In operation, the first signal transmitted from the example drone swarm controller 104a to the example discovery drone 120 causes the discovery drone to navigates throughout the environment 100, query user equipment, nodes, and/or equipment in the environment 100 via a discovery signal, and transmit a fourth signal to the example drone swarm controller 104a, the fourth signal including the one or more values, an identifier of the example discovery drone 120, and a position of the example discovery drone 120 in the example environment 100. The discovery signal is a signal that includes one or more of a request for one or more values, an identifier of the example drone swarm controller 104a, an identifier of the example discovery drone 120, an identifier of user equipment, nodes, and/or other equipment, an identifier of one or more measurement collection nodes (e.g., the measurement collection node 116), a transmission power associated with the discovery signal, a position of the example drone swarm controller 104a in the example environment 100, and a position of the example discovery drone 120 in the environment 100. In operation, the example discovery drone 120, in response to the first signal, can navigate throughout the environment and query user equipment, other nodes, and/or drones in the environment 100 via a discovery signal after disconnecting from the example drone swarm controller 104a.

In operation, the example measurement collection node 116, in response to receiving the third signal from the example sensor node 114, transmits a fifth signal to the example drone swarm controller 104a, the fifth signal including the one or more metric values, an identifier of the sensor node 114, and a position of the sensor node 114 in the environment 100.

In other examples, any of the example initiator node 112, the example sensor node 114, or the example discovery drone 120 can transmit the second signal, the third signal, and the fourth signal, respectively, to the example drone swarm controller 104a or the example measurement collection node 116 depending on the position of the example initiator node 112, the position of the example sensor node 114, the position of the example discovery drone 120, the position of the example drone swarm controller 104a, and the type of radio architecture (e.g., radio architecture 106b, 106c, 106f, etc.) implemented on the example initiator node 112, the example sensor node 114, and the example discovery drone 120. For example, when the one or more values obtained from the user equipment, other nodes, and/or drones indicates that the position of the example drone swarm controller 104a exceeds a threshold distance between the example drone swarm controller 104a and the example initiator node 112, the example initiator node 112 transmits the second signal to the example measurement collection node 116. When the one or more values obtained from the user equipment, other nodes, and/or drones indicates that the position of the example drone swarm controller 104a exceeds a threshold distance between the example drone swarm controller 104a and the example sensor node 114, the example sensor node 114 transmits the third signal to the example measurement collection node 116. When the one or more values obtained from the user equipment, other nodes, and/or drones indicates that the position of the example drone swarm controller 104a exceeds a threshold distance between the example drone swarm controller 104a and the example discovery drone 120, the example discovery drone 120 transmits the fourth signal to the example measurement collection node 116.

However, when the one or more values indicate that the position of the example drone swarm controller 104a does not exceed a threshold distance between the example initiator node 112, the example sensor node 114, or the example discovery drone 120, the example initiator node 112, the example sensor node 114, and the example discovery drone 120 transmit the second signal, the third signal, and the fourth signal, respectively, to the example drone swarm controller 104a.

In the illustrated example, the example initiator node 112 obtains via a query of the example second user equipment 124 and the example third user equipment 126, one or more values corresponding to the example second user equipment 124 and the example third user equipment 126, the example sensor node 114 senses one or more value corresponding to the example first user equipment 122, the example second user equipment 124 and the example third user equipment 126, the example fourth user equipment 128, and the example fifth user equipment 130, and the example discovery drone obtains, via a discovery signal one or more values corresponding to the example first user equipment 122, the example second user equipment 124 and the example third user equipment 126, the example fourth user equipment 128, and the example fifth user equipment 130. The example initiator node 112, the example sensor node 114, and the example discovery drone 120 transmit the one or more values as well as an identifier of the initiator node 112, a position of the initiator node 112 in the environment 100, an identifier of the sensor node 114, a position of the sensor node 114 in the environment 100, an identifier of the discovery drone 120, and a position of the discovery drone 120 in the environment 100 to either the measurement collection node 116 or the drone swarm controller 104*a* depending on the position of the initiator node 112, the position of the sensor node 114, the position of the discovery drone 120, and the position of the drone swarm controller 104*a* in the environment 100.

In such an example, the measurement collection node 116 transmits the one or more values as well as an identifier of the initiator node 112, a position of the initiator node 112 in the environment 100, an identifier of the sensor node 114, a position of the sensor node 114 in the environment 100, an identifier of the discovery drone 120, and a position of the discovery drone 120 in the environment 100 to the drone swarm controller 104*a*.

In operation, the example drone swarm controller 104*a* collects the one or more values corresponding to the user equipment, other nodes, and/or drones in the environment from the initiator node 112, the sensor node 114, the measurement collection node 116, and/or the discovery drone 120. In response to a trigger event, the example drone swarm controller 104*a* determines a position of the initiator node 112, a position of the sensor node 114, a position of the measurement collection node 116, a position of the access drone 118, and a position of the discovery drone 120 in the environment. The positions correspond to an orientation of the initiator node 112, the sensor node 114, the measurement collection node 116, the access drone 118, and the discovery drone 120 in the environment 100 that provides the network 108 to the example first user equipment 122, the example second user equipment 124, the example third user equipment 126, the example fourth user equipment 128, and the example fifth user equipment 130. The example drone swarm controller 104*a* transmits a signal via the radio architecture 106*a* to the initiator node 112, the sensor node 114, the measurement collection node 116, the access drone 118, and the discovery drone 120 to cause the initiator node 112, the sensor node 114, the measurement collection node 116, the access drone 118, and the discovery drone 120 to regulate the position of the initiator node 112, the position of the sensor node 114, the position of the measurement collection node 116, the position of the access drone 118, and the position of the discovery drone 120, respectively, to establish and/or maintain one or more connections between the example first user equipment 122, the example second user equipment 124, the example third user equipment 126, the example fourth user equipment 128, the example fifth user equipment 130, and the example network 108.

In the illustrated example, a trigger event includes one or more of the status of connections indicating the user equipment is not connected to the any network, the noise level of the connection to a network different from the example network 108 not satisfying a first threshold value, the signal strength associated with the connections to the network different from the example network 108 not satisfying a second threshold, the signal-to-noise ratio associated with the connections to the network different from the example network 108 not satisfying a third threshold, and the pathloss associated with the connections to the network different from the example network 108 not satisfying a fourth threshold.

Figure 2:
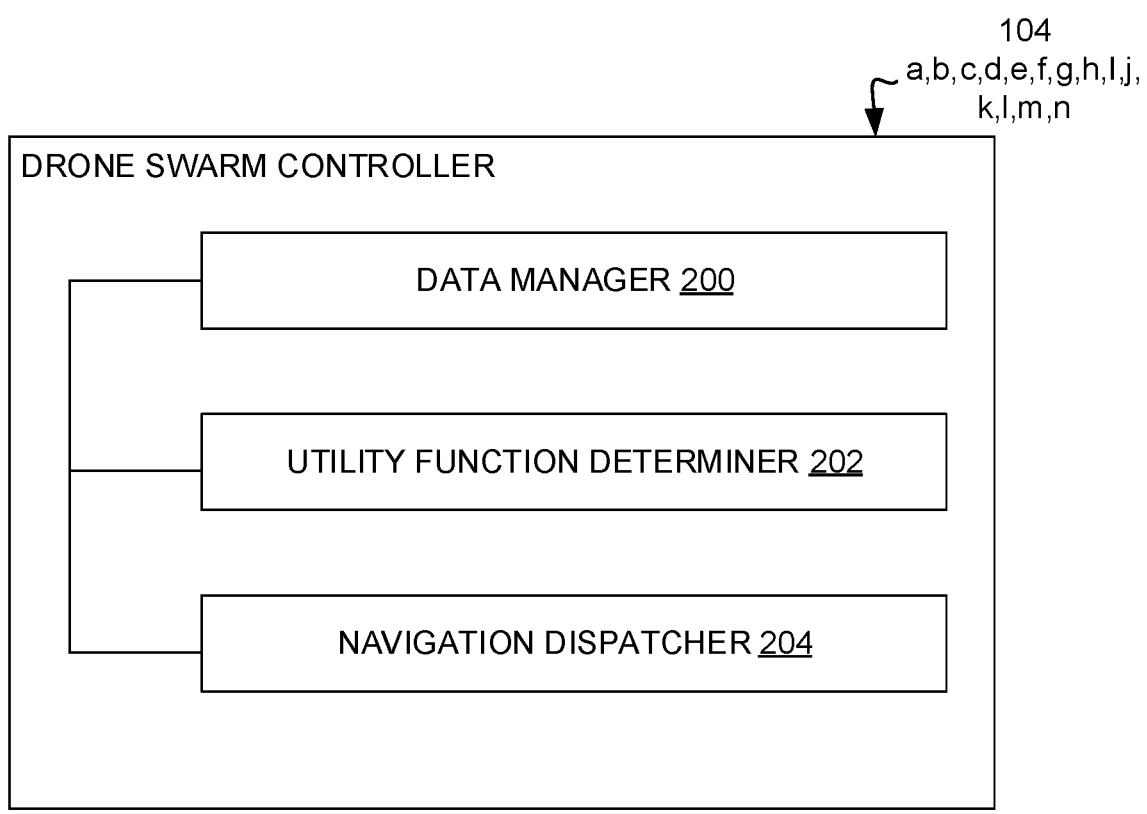
FIG. 2 is a block diagram showing further detail of an example drone swarm controller in accordance with some examples.

FIG. 2 is a block diagram showing further detail of one of the example drone swarm controller 104*a*, the example drone swarm controller 104*b*, the example drone swarm controller 104*c*, the example drone swarm controller 104*d*, the example drone swarm controller 104*e*, the example drone swarm controller 104*f*, the example drone swarm controller 104*g*, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* in accordance with some examples. In the example, the one of the example drone swarm controller 104*a*, the example drone swarm controller 104*b*, the example drone swarm controller 104*c*, the example drone swarm controller 104*d*, the example drone swarm controller 104*e*, the example drone swarm controller 104*f*, the example drone swarm controller 104*g*, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* includes a means for data managing, a means for utility function determining, and a means for navigation dispatching.

In the illustrated example of FIG. 2, the means for data managing is implemented by an example data manger 200. For example, the means for data managing is implemented by executable instructions such as that implemented by the data manager 200 of FIG. 2, which may be executed on a processor such as the example processor 1712 shown in the example of FIG. 17. Alternatively the means for data managing may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the illustrated example of FIG. 2, the means for utility function determining is implemented by an example utility function determiner 202. For example, the means for utility function determining is implemented by executable instructions such as that implemented by the utility function determiner 202 of FIG. 2, which may be executed on a processor such as the example processor 1712 shown in the example of FIG. 17. Alternatively the means for utility function determining may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the illustrated example of FIG. 2, the means for navigation dispatching is implemented by an example navigation dispatcher 204. For example, the means for navigation dispatching is implemented by executable instructions such as that implemented by the navigation dispatcher 204 of FIG. 2, which may be executed on a processor such as the example processor 1712 shown in the example of FIG. 17. Alternatively the means for navigation dispatching may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

As used herein, the term means for data managing may be referred to interchangeably as a data managing means. As used herein, the term means for utility function determining may be referred to interchangeably as a utility function determining means. As used herein, the term means for navigation dispatching may be referred to interchangeably as a navigation dispatching means.

In the illustrated example of FIG. 2, the example data manager 200 is coupled to the example utility function determiner 202 and the example navigation dispatcher 204. In the illustrated example, the example data manager 200 is a device that manages the collection of data from user equipment, other nodes, and/or drones in the environment 100. For example, the example data manager 200 transmits a first signal to one or more of the example initiator node 112, the example sensor node 114, and the example discovery drone 120, the first signal to cause one or more of the example initiator node 112, the example sensor node 114, and the example discovery drone 120 to discovery user equipment, other nodes, and/or drones in the environment 100. The example data manager 200 also collects one or more values corresponding to the user equipment (e.g., the example first user equipment 122, the example second user equipment 124, etc.) from one or more of the example initiator node 112, the example sensor node 114, the example measurement collection node 116, and the example discovery drone 120. In addition to the one or more values, the example data manger 200 collects an identifier of the initiator node 112, a position of the initiator node 112 in the environment 100, an identifier of the sensor node 114, a position of the sensor node 114 in the environment 100, an identifier of the discovery drone 120, and a position of the discovery drone 120 in the environment 100 from the initiator node 112, the sensor node 114, and the discovery drone 120, respectively. In the illustrated example, the example data manager 200 is implemented as a controller (e.g., a data management controller, a data management device, etc.). In other examples, the example data manager 200 is implemented as one or more processors executing machine readable instructions.

In the illustrated example of FIG. 2, the example utility function determiner 202 is a device that determines one or more positions of one or more nodes and/or drones in an environment (e.g., the environment 100) to optimize a utility function associated with user equipment connected to a network including the utility function determiner 202. For example, the example utility function determiner 202 is a utility function determiner controller (e.g., a utility function determiner device). In other examples, the example utility function determiner 202 is one or more processors executing machine readable instructions. The example utility function determiner 202 determines one or more positions of one or more nodes and/or drones in an environment to optimize a utility function associated with the signal strength associated with the connections between the user equipment and a network. In other examples, the utility function determiner 202 determines one or more positions of one or more nodes and/or drones in an environment to optimize a utility function associated with other values (e.g., SNR, pathloss, etc.). the utility function determiner 202 executes a particle swarm optimization algorithm to optimize the position of the example initiator node 112, the example sensor node 114, the example measurement collection node 116, the example access drone 118, and the example discovery drone 120. For example, the example utility function determiner 202 utilizes a gradient descent, a newton search, a brute-force search, a bisection search, or a golden search based algorithm to optimize the position of the example initiator node 112, the example sensor node 114, the example measurement collection node 116, the example access drone 118, and the example discovery drone 120.

In the illustrated example, a particle is a set of positions of all the nodes and/or drones in a swarm. Each particle includes a velocity value that corresponds to the Euclidian distance to be travelled from the particle orientation position at the current iteration to the particle orientation position at the next iteration and a position value that corresponds to a location of a particle orientation in a Euclidian space representative of a feasible set of all particle orientations. The utility function determiner 202 iteratively steps through the different particle swarm orientations until all the particle swarm orientations converge on the same utility function value or a predetermined number of iterations have taken place.

In the illustrated example of FIG. 2, the example utility function determiner 202 generates a set of N random particles. Additionally, the example utility function determiner 202 determines a number of user equipment covered for each particle swarm orientation. The example utility function determiner 202 determines whether the value of the utility function for the current particle orientation being evaluated is greater than the value of the utility function for the previous particle orientation that was evaluated. If the value of the utility function of the current particle orientation being evaluated is greater than the value of the value of the utility function for the particle orientation that was previously evaluated, the utility function determiner 202 updates the global particle orientation velocity to the particle orientation velocity of the current particle orientation being evaluated. If the value of the utility function of the current particle orientation being evaluated is not greater than the value of the value of the utility function for the particle orientation that was previously evaluated, the utility function determiner 202 sets the current particle orientation as the best particle orientation for that particle (e.g., sets a local best for that particle). The utility function determines 202 determines whether all the particle orientations for that particle have been compared. If all the particles have been compared, the utility function determiner 202 determines whether the utility function for the local best particle orientation is greater than the utility function of the global best particle orientation. If all the particles have not been compared, the utility function determiner 202 determines whether the value of the utility function for the current particle orientation being evaluated is greater than the value of the utility function for the previous particle orientation that was evaluated.

In the illustrated example of FIG. 2, the example utility function determiner 202 determines whether the value of the utility function for the local best particle orientation is greater than the value of the utility function for the global best particle orientation. If the example utility function determiner 202 determines that the value of the utility function for the local best particle orientation is greater than the value of the utility function for the global best particle orientation, the example utility function determiner 202 sets the local best particle orientation as the global best particle orientation. If the example utility function determiner 202 determines that the value of the utility function for the local best particle orientation is not greater than the value of the utility function for the global best particle orientation, the utility function determiner 202 updates the velocity for the current particle for which the utility function is being determined. The utility function determiner 202 also updates the position of the particle for which the utility function is being determined.

In the illustrated example of FIG. 2, the utility function determiner 202 determines whether a threshold number of iterations of the particle swarm optimization algorithm have been executed. If the utility function determiner 202 determines that the threshold number of iterations of the particle swarm optimization algorithm have been executed, the utility function determiner 202 outputs the global best particle orientation. If the utility function determiner 202 determines that the threshold number of iterations of the particle swarm optimization algorithm have not been executed, the utility function determiner 202 determines whether a predefined utility function value has been reached. If the utility function determiner 202 determines that the predefined utility function value has been reached, the utility function determiner 202 outputs the particle orientation corresponding to the predefined utility function value. If the utility function determiner 202 determines that the predefined utility function value has not been reached, the utility function determiner 202 determines a number of user equipment covered for each particle swarm orientation.

In the illustrated example of FIG. 2, the example navigation dispatcher 204 is a device that transmits a signal to the example initiator node 112, the example sensor node 114, the example measurement collection node 116, the example access drone 118, and the example discovery drone 120 to cause the example initiator node 112, the example sensor node 114, the example measurement collection node 116, the example access drone 118, and the example discovery drone 120 to regulate the position of the example initiator node 112, the position of the example sensor node 114, the position of the example measurement collection node 116, the position of the example access drone 118, and the position of the example discovery drone 120, respectively. For example, the example navigation dispatcher 204 is a navigation dispatcher controller (e.g., a navigation dispatcher device). In other examples, the example navigation dispatcher 204 is one or more processors executing machine readable instructions.

In operation, the example navigation dispatcher 204 transmits a signal to one or more of the example initiator node 112, the example sensor node 114, the example measurement collection node 116, the example access drone 118, and the example discovery drone 120 to establish a default orientation of the drone swarm. Next, the example navigation dispatcher 204 determines whether individual drone navigation is active. If individual drone navigation is not active, the example navigation dispatcher 204 activates drone navigation for each of the example initiator node 112, the example sensor node 114, the example measurement collection node 116, the example access drone 118, and the example discovery drone 120. If individual drone navigation is active, the example data manager 200 sends a first signal to one or more of the example initiator node 112, the example sensor node 114, and the example discovery drone 120 to cause the example initiator node 112, the example sensor node 114, and the example discovery drone 120 to start a discovery process of user equipment, other nodes, and/or drones in the environment 100.

In operation, the example data manager 200 collects one or more values corresponding to user equipment via one or more of the example initiator node 112, the example sensor node 114, the example measurement collection node 116, the example access drone 118, and the example discovery drone 120. The example utility function determiner 202 determines whether a trigger event has occurred, the trigger event corresponding to the one or more values. In response to the trigger event, the example utility function determiner 202 determines one or more positions of the example initiator node 112, the example sensor node 114, the example measurement collection node 116, the example access drone 118, and the example discovery drone 120 in the environment 100, the one or more positions corresponding to an orientation of that drone swarm that optimizes a utility function according to a particle swarm optimization algorithm. The example navigation dispatcher 204 transmits a signal to one or more of the example initiator node 112, the example sensor node 114, the example measurement collection node 116, the example access drone 118, and the example discovery drone 120, the signal to cause the example initiator node 112, the example sensor node 114, the example measurement collection node 116, the example access drone 118, and the example discovery drone 120 to regulate the one or more positions to establish and/or maintain one or more connections between user equipment in the environment 100 and the example network 108.

In operation, the example data manager 200 determines whether the drone swarm is still in use. For example, the example data manager 200 determines, based on the one or more values whether the user equipment, other nodes, and/or drones are still accessing the example network 108 via one or more of the example initiator node 112, the example sensor node 114, the example measurement collection node 116, the access drone 118, and the example discovery drone 120. If the drone swarm is still in use, the example data manager 200 transmits a signal to one or more of the example initiator node 112, the example sensor node 114, and the example discovery drone 120 to cause one or more of the example initiator node 112, the example sensor node 114, and the example discovery drone 120 to start a discovery process of user equipment, other nodes, and/or drones in the environment 100. If the drone swarm is not still in use, the example navigation dispatcher 204 transmits a signal to the example initiator node 112, the example sensor node 114, the example measurement collection node 116, the example access drone 118, and the example discovery drone 120 to return to a preset location.

Figure 3:
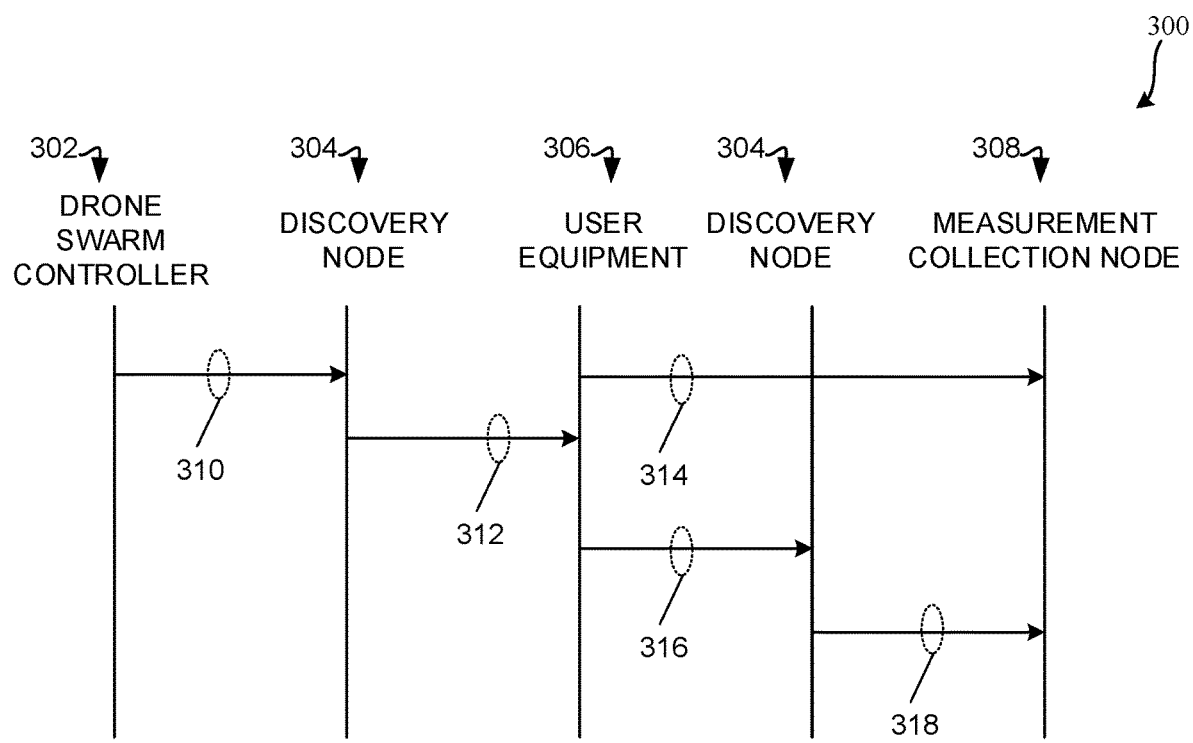
FIG. 3 is sequence diagram illustrating communication between an example drone swarm controller, an example discovery node, an example user equipment, and an example measurement collection node.

FIG. 3 is sequence diagram 300 illustrating communication between an example drone swarm controller 302, an example discovery node 304, an example user equipment 306, and an example measurement collection node 308. In the illustrated example, the example drone swarm controller 302 is a device that controls the nodes and/or drones in an example environment. For example, the example drone swarm controller 302 is the example drone swarm controller 104a of FIG. 1 and FIG. 2. In other examples, the example drone swarm controller 302 is the example drone swarm controller 104b, the example drone swarm controller 104c, the example drone swarm controller 104d, the example drone swarm controller 104e, the example drone swarm controller 104f, or any combination thereof.

In the illustrated example, the discovery node 304 is any node that starts a discovery process of user equipment (e.g., the example user equipment 306) in an environment. For example, the example discovery node 304 is the example discovery drone 120 of FIG. 1. In other examples, the discovery node 304 is the example drone swarm controller 104a, the example initiator node 112, the example sensor node, the example measurement collection node 116, and/or the example access drone 118. In further examples, the example discovery node 304 is the example control center 102.

In the illustrated example of FIG. 3, the example user equipment 306 is be any device that is used by an end user to communicate using (e.g., access) a network. For example, the example user equipment 306 is the example first user equipment 122 of FIG. 1. In other examples the example user equipment 306 is the example second user equipment 124, the example third user equipment 126, the example fourth user equipment 128, the example fifth user equipment 130, or any combination thereof.

In the illustrated example, the example measurement collection node 308 is any node that the example user equipment 306 connects to, in response to the query from the example discovery node 304, to transmit the one or more requested values to. In other examples, the example measurement collection node 308 is any node that the example discovery node 304 connects to, in response to retrieving the one or more values from the example user equipment 306, in order to transmit the one or more values to. For example, the example measurement collection node 308 is the example measurement collection node 116 of FIG. 1. In other examples, the example measurement collection node 308 is the example drone swarm controller 104a, the example control center 102, the example initiator node 112, the example sensor node 114, the example access drone 118, the example discovery drone 120, or any combination thereof.

In the illustrated example of FIG. 3, the example drone swarm controller 302 transmits an example first signal 310 to the example discovery node 304. In the illustrated example, the example first signal 310 includes one or more of an executable instruction to cause the example discovery node 304 to discovery the example user equipment 306 in an environment, an identifier of the drone swarm controller 302, an identifier of the measurement collection node 308, and a position of the example drone swarm controller 302 in an environment. In some examples, the example user equipment is within a network including the example drone swarm controller 302 and the example discovery node 304. In other examples, the example user equipment 306 is outside of a network including the example drone swarm controller 302 and the example discovery node 304.

In response to the example first signal 310, the example discovery node 304 starts a discovery process to discovery the example user equipment 306 in the environment. The example discovery node 304 transmits an example second signal 312 to the example user equipment 306. In the illustrated example, the example second signal 312 is a discovery signal and the example second signal 312 includes one or more of a request for one or more values corresponding to the user equipment 306, the one or more values including the identifier of the example drone swarm controller 302, an identifier of the example discovery node 304, an identifier of the example user equipment 306, the identifier of the measurement collection node 308, a transmission power of the example second signal 312, the position of example drone swarm controller 302, and a position of the example discovery node 304 in an environment.

In response to a distance between the example user equipment 306 and the example discovery node 304 exceeding a threshold value, the example user equipment 306 transmits an example third signal 314 to the example measurement collection node 308. If the distance between the example user equipment 306 and the example discovery node 304 does not exceed the threshold value, the example user equipment 306 transmits an example fourth signal 316 to the example discovery node 304. The example third signal 314 includes the one or more values and the example fourth signal 316 includes the one or more values.

In the illustrated example, in response to receiving the example fourth signal 316, the example discovery node 304 transmits an example fifth signal 318 to the example measurement collection node 308. The example fifth signal 318 includes the one or more values, the identifier of the example discovery node 304, and a position of the example discovery node 304 in an environment.

Figure 4:
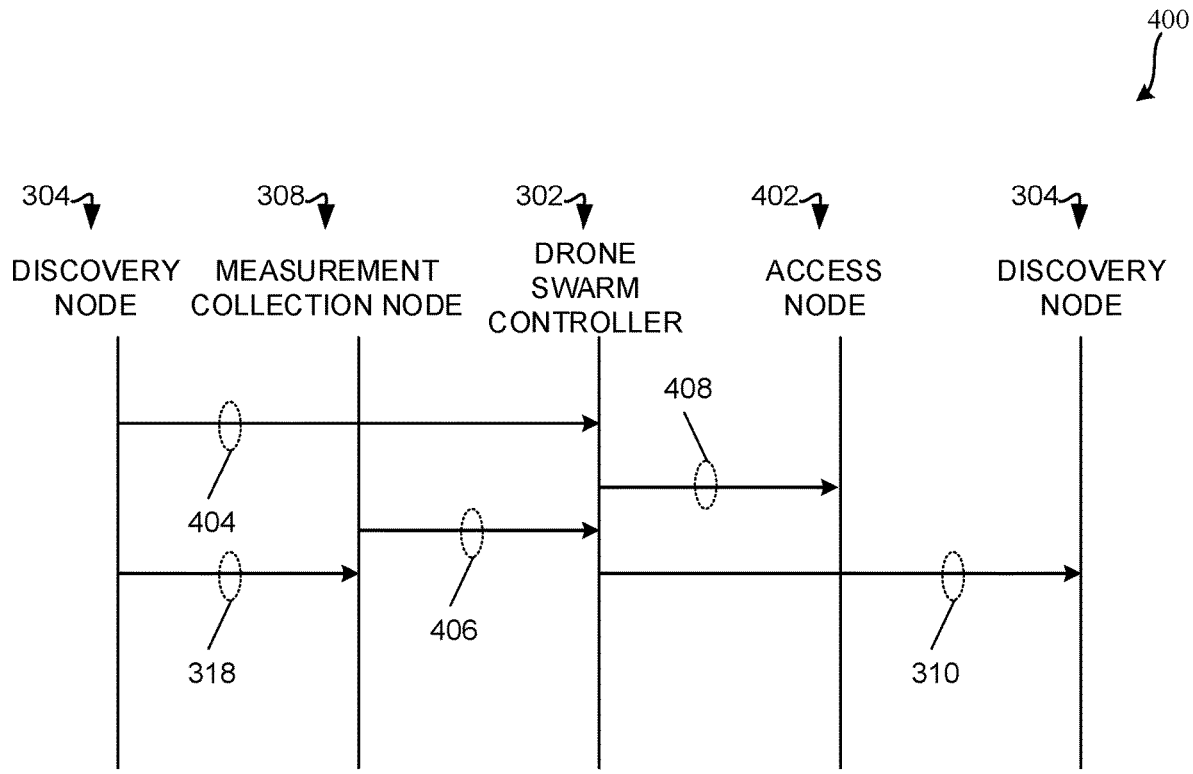
FIG. 4 is sequence diagram illustrating communication between the example discovery node, the example measurement collection node, the example drone swarm controller, an example access node, and the example discovery node.

FIG. 4 is sequence diagram 400 illustrating communication between the example discovery node 304, the example measurement collection node 308, the example drone swarm controller 302, an example access node 402, and the example discovery node 304. In the illustrated example, the example access node 402 is any node that is capable of operating as an access point. For example, the example access node 402 is the example access drone 118 of FIG. 1. In other examples, the example access node 402 is the example control center 102, the example initiator node 112, the example sensor node 114, the example measurement collection node 116, the example discovery drone 120, or any combination thereof.

In the illustrated example of FIG. 4, in response to a distance between the example discovery node 304 and the example drone swarm controller 302 exceeding a threshold value, the example user equipment 306 transmits the example fifth signal 318 to the example measurement collection node 308. If the distance between the example discovery node 304 and the example drone swarm controller 302 does not exceed the threshold value, the example discovery node 304 transmits an example sixth signal 404 to the example drone swarm controller 302. The example sixth signal 404 includes the one or more values, the identifier of the discovery node 304, and the position of the example discovery node 304 in an environment.

In the illustrated example, in response to receiving the example fifth signal 318, the example measurement collection node 308 transmits an example seventh signal 406 to example drone swarm controller 302. The example seventh signal 406 includes the one or more values, the identifier of the discovery node 304, and the position of the discovery node 304 in an environment.

In the illustrated example of FIG. 4, the example drone swarm controller 302 determines one or more positions of the example access node 402 and the example discovery node 304 in an environment to optimize a utility function corresponding to one of the one or more values. After determining the one or more positions, the example drone swarm controller 302 transmits an example eighth signal 408 to the example access node 402. The example eighth signal 408 includes an executable instruction to cause the example access node 402 to regulate a position of the example access node 402 to establish and/or maintain one or more connections between the example user equipment 306 and a network including one or more of the example access node 402, the example discovery node 304, and the example drone swarm controller 302. The example drone swarm controller 302 additionally transmits the first signal 310 to the example discovery node 304.

Figure 5:
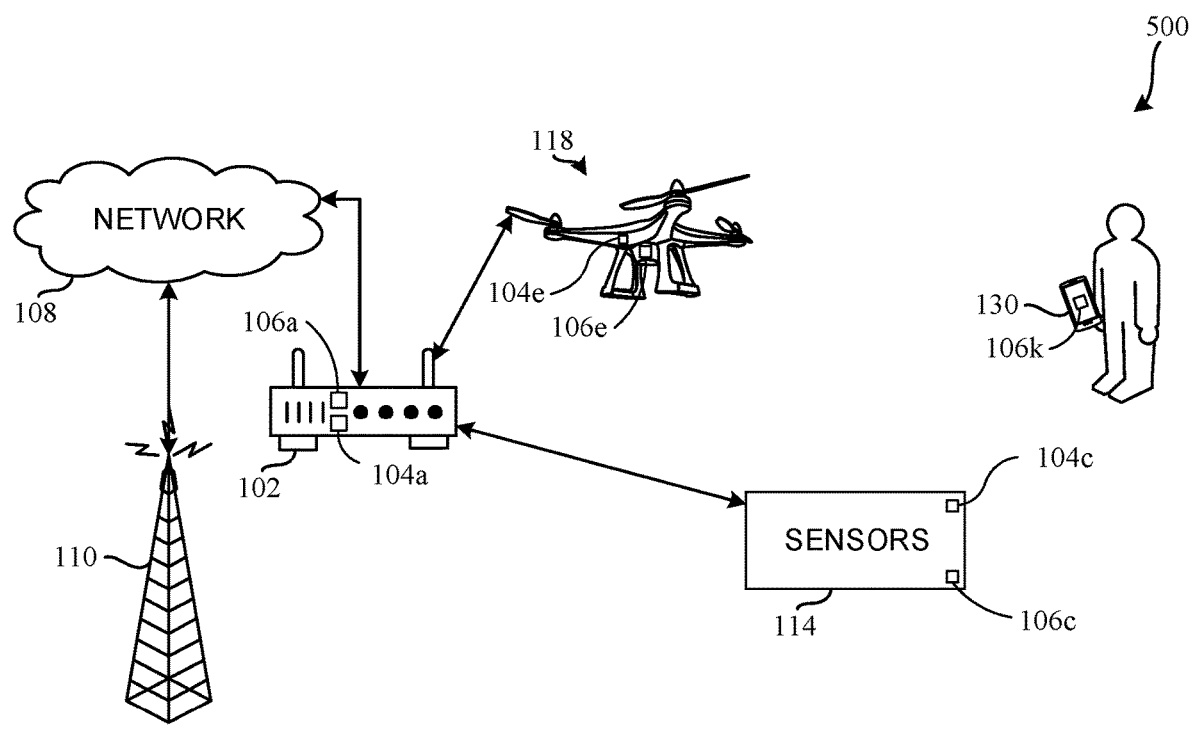
FIG. 5 is an illustration of an example environment including an alternative example drone swarm including the example control center, the example access drone, and the example sensor node of FIG. 1.

FIG. 5 is an illustration of an example environment 500 including an alternative example drone swarm including the example control center 102, the example access drone 118, and the example sensor node 114 of FIG. 1. The example environment 500 additionally includes the example network 108, the example base station 110, and the example fifth user equipment 130 of FIG. 1. The example control center 102 includes the example radio architecture 106a and the example drone swarm controller 104a. The example sensor node 114 includes the example radio architecture 106c and the example drone swarm controller 104c. The example access drone 118 includes the example radio architecture 106e and the example drone swarm controller 104e. In the illustrated example, the example control center 102 is communicatively coupled to the example network 108, the example sensor node 114, and the example access drone 118. In the illustrated example, the example base station 110 is communicatively coupled to the example network 108.

In the illustrated example of FIG. 5, the example fifth user equipment 130 is outside of the example network 108. In such an example, the fifth user equipment 130 is not connected to any other networks. In other examples, the example fifth user equipment 130 is communicatively coupled to a second network different than the example network 108.

In the illustrated example of FIG. 5, the example drone swarm controller 104a transmits a first signal to the example sensor node 114 to cause the example sensor node 114 to start a discovery process of user equipment in the example environment 500. The first signal causes the example sensor node 114 to sense one or more values corresponding to the example fifth user equipment 130. In other examples, the example sensor node 114 has previously sensed and stored the one or more values. In such an example, the first signal indicates the position of the example drone swarm controller 104a is less than a threshold distance from the example sensor node 114. For example, the example sensor node 114 is capable of receiving signals via longer distance radio architecture (e.g., LTE RAT) (e.g., has a larger propagation distance), but it is only capable of transmitting over short distance radio architecture (e.g., Wi-Fi RAT). In response to the first signal, the example sensor node 114 transmits the one or more values, a position of the example sensor node 114 in the environment 500, and an identifier of the example sensor node 114 to the example drone swarm controller 104a.

In the illustrated example of FIG. 5, the example drone swarm controller 104a determines one or more positions of the example sensor node 114 and the example access drone 118 to optimize a connection to be made between the example fifth user equipment 130 and the example network 108. The example drone swarm controller 104a transmits a second signal to one or more of the example sensor node 114 and the example access drone 118. The second signal is to cause the example access drone 118 to regulate the position of the example access drone 118 to establish a connection between the example fifth user equipment 130 and the example network 108. The second signal is to cause the example sensor node 114 to sense the one or more values from the example fifth user equipment 130. In the illustrated example, the example access drone 118 facilitates communication between the example fifth user equipment 130 and the example control center 102.

Figure 6:
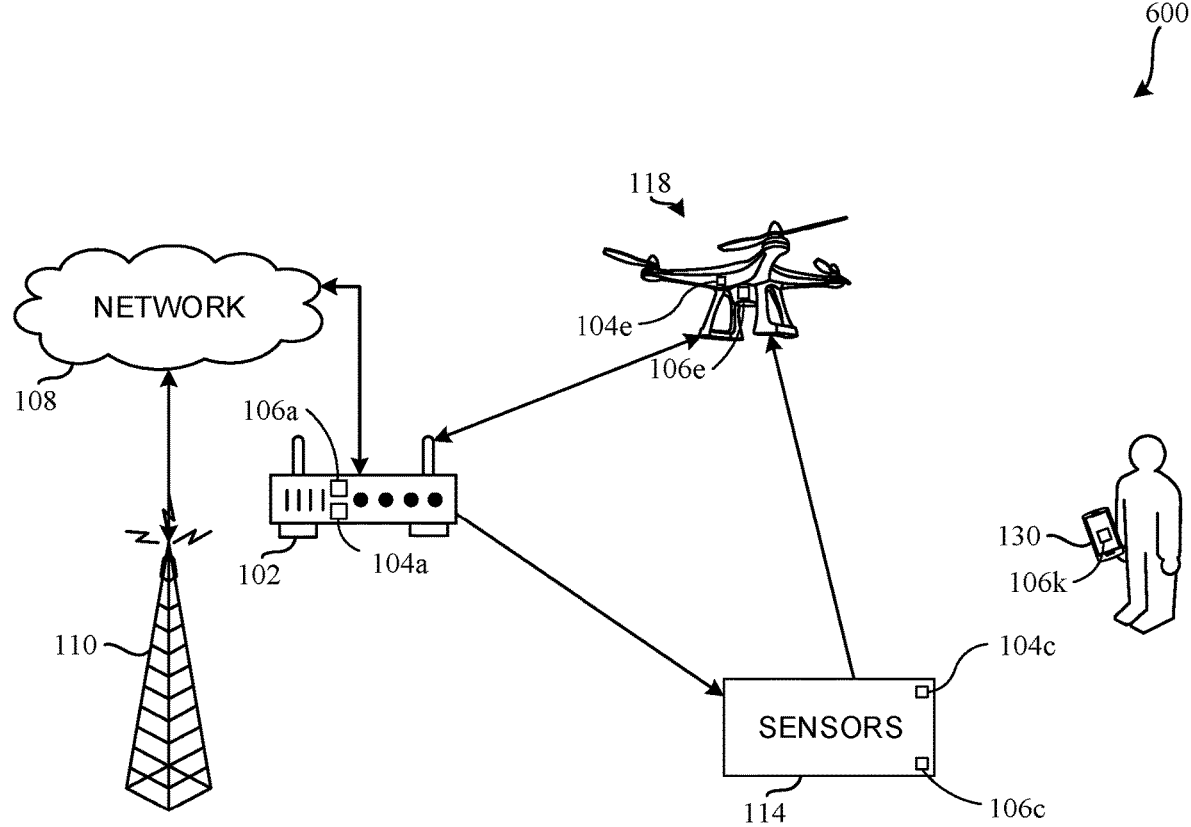
FIG. 6 is an illustration of an example environment including an alternative example drone swarm including the example control center, the example access drone, and the example sensor node of FIG. 1.

FIG. 6 is an illustration of an example environment 600 including an alternative example drone swarm including the example control center 102, the example access drone 118, and the example sensor node 114 of FIG. 1. The example environment 600 additionally includes the example network 108, the example base station 110, and the example fifth user equipment 130 of FIG. 1. The example control center 102 includes the example radio architecture 106a and the example drone swarm controller 104a. The example sensor node 114 includes the example radio architecture 106c and the example drone swarm controller 104c. The example access drone 118 includes the example radio architecture 106e and the example drone swarm controller 104e. In the illustrated example, the example control center 102 is communicatively coupled to the example network 108, the example sensor node 114, and the example access drone 118. In the illustrated example, the example base station 110 is communicatively coupled to the example network 108. In the illustrated example, the example sensor node 114 is communicatively coupled to the example access drone 118.

In the illustrated example of FIG. 6, the example fifth user equipment 130 is outside of the example network 108. In such an example, the fifth user equipment 130 is not connected to any other networks. In other examples, the example fifth user equipment 130 is communicatively coupled to a second network different than the example network 108.

In the illustrated example of FIG. 6, the example drone swarm controller 104a transmits a first signal to the example sensor node 114 to cause the example sensor node 114 to start a discovery process of user equipment in the example environment 600. The first signal causes the example sensor node 114 to sense one or more values corresponding to the example fifth user equipment 130. In other examples, the example sensor node 114 has previously sensed and stored the one or more values. In such an example, the first signal indicates the position of the example drone swarm controller 104a is greater than a threshold distance from the example sensor node 114. For example, the example sensor node 114 is capable of receiving signals via longer distance radio architecture (e.g., LTE RAT) (e.g., has a larger propagation distance), but it is only capable of transmitting over short distance radio architecture (e.g., Wi-Fi RAT). In such an example, the example access drone 118 is within the threshold distance corresponding to the example sensor node 114. In the example, the example access drone 118 is capable of transmitting and receiving signals over both longer distance (e.g., a larger propagation distance) and short distance (e.g., a shorter propagation distance) radio architecture. In response to the first signal, the example sensor node 114 transmits the one or more values, a position of the example sensor node 114 in the environment 600, and an identifier of the example sensor node 114 to the example access drone 118. The example access drone 118 transmits the one or more values, a position of the example sensor node 114 in the environment 600, and an identifier of the example sensor node 114 to the example drone swarm controller 104a.

In the illustrated example of FIG. 6, the example drone swarm controller 104a determines one or more positions of the example sensor node 114 and the example access drone 118 to optimize a connection to be made between the example fifth user equipment 130 and the example network 108. The example drone swarm controller 104a transmits a second signal to one or more of the example sensor node 114 and the example access drone 118. The second signal is to cause the example access drone 118 to regulate the position of the example access drone 118 to establish a connection between the example fifth user equipment 130 and the example network 108. The second signal is to cause the example sensor node 114 to sense the one or more values from the example fifth user equipment 130. In the illustrated example, the example access drone 118 facilitates communication between the example fifth user equipment 130 and the example control center 102.

Figure 7:
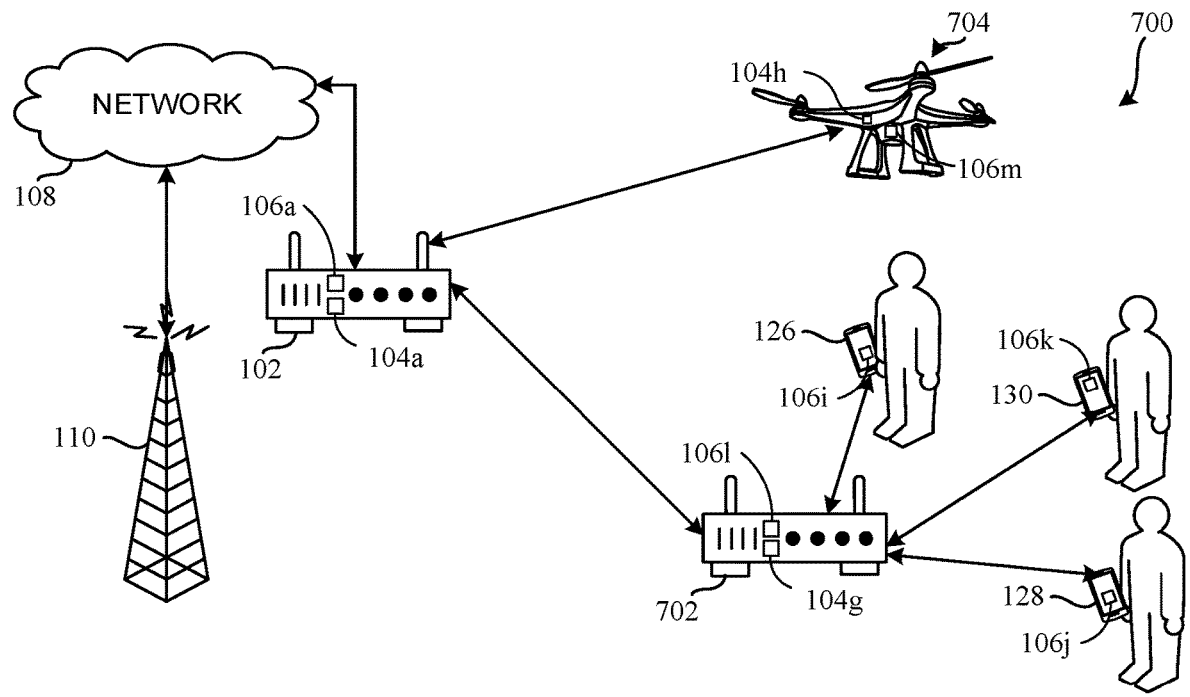
FIG. 7 is an illustration of an example environment including an alternative example drone swarm including the example control center, an additional example access point, and an additional example access drone.

FIG. 7 is an illustration of an example environment 700 including an alternative example drone swarm including the example control center 102, an example access point 702, and an example access drone 704. The example environment 700 additionally includes the example network 108, the example base station 110, the example third user equipment 126, the example fourth user equipment 128, and the example fifth user equipment 130 of FIG. 1. The example control center 102 includes the example radio architecture 106a and the example drone swarm controller 104a. The example access point 702 includes an example radio architecture 106l and an example drone swarm controller 104g. The example access drone 704 includes an example radio architecture 106m and an example drone swarm controller 104h. In the illustrated example, the example control center 102 is communicatively coupled to the example network 108, the example access point 702, and the example access drone 704. In other examples, the example control center 102 is collocated with the example access point 702. In the illustrated example, the example base station 110 is communicatively coupled to the example network 108. In the illustrated example, the example access point 702 is communicatively coupled to the example third user equipment 126, the example fourth user equipment 128, and the example fifth user equipment 130.

In the illustrated example of FIG. 7, the example control center 102 operates based on a first radio architecture (e.g., radio architecture 106a). For example, the first radio architecture is a first communication medium (e.g., UMTS, GSM, Wi-Fi, etc.). In the illustrated example of FIG. 7, the example access point 702 operates based on a second radio architecture (e.g., radio architecture 106l). For example, the second radio architecture is a second communication medium, different from the first communication medium (e.g., LTE, EDGE, etc.). In the example, the example third user equipment 126, the example fourth user equipment 128, and the example fifth user equipment 130 are communicatively coupled to the example network 108 via the example access point 702.

In the illustrated example of FIG. 7, the example drone swarm controller 104a transmits a first signal the example access point 702. The first signal causes the access point 702 to start a discovery process of user equipment in the example environment 700. In response to the first signal, the example access point 702 queries the example third user equipment 126, the example fourth user equipment 128, and the example fifth user equipment 130 for one or more values according to the example third user equipment 126, the example fourth user equipment 128, and the example fifth user equipment 130, respectively. In other examples, the example access point 702 has previously queried and stored the one or more values. In response to the first signal, the example access point 702 transmits the one or more values, a position of the example access point 702 in the environment 700, and an identifier of the example access point 702 to the example drone swarm controller 104a.

In the illustrated example of FIG. 7, the example drone swarm controller 104a determines a position of the example access drone 704 to optimize a connection to be made between the example fifth user equipment 130 and the example control center 102 (e.g., a second communication medium). The example drone swarm controller 104a transmits a second signal to the example access drone 704. The second signal is to cause the example access drone 704 to regulate the position of the example access drone 704 to establish a connection between the example fifth user equipment 130 and the example control center 102 (e.g., the second communication medium). The second signal additionally causes the example access drone 704 to query the example fifth user equipment 130 for the one or more values. The example drone swarm controller 104a additionally transmits the second signal to the example access point 702. The second signal is to cause the example access point 702 to query the third user equipment 126 and the fourth user equipment 128 for the one or more values. In the illustrated example, the example access drone 704 facilitates communication between the example fifth user equipment 130 and the example control center 102.

Figure 8:
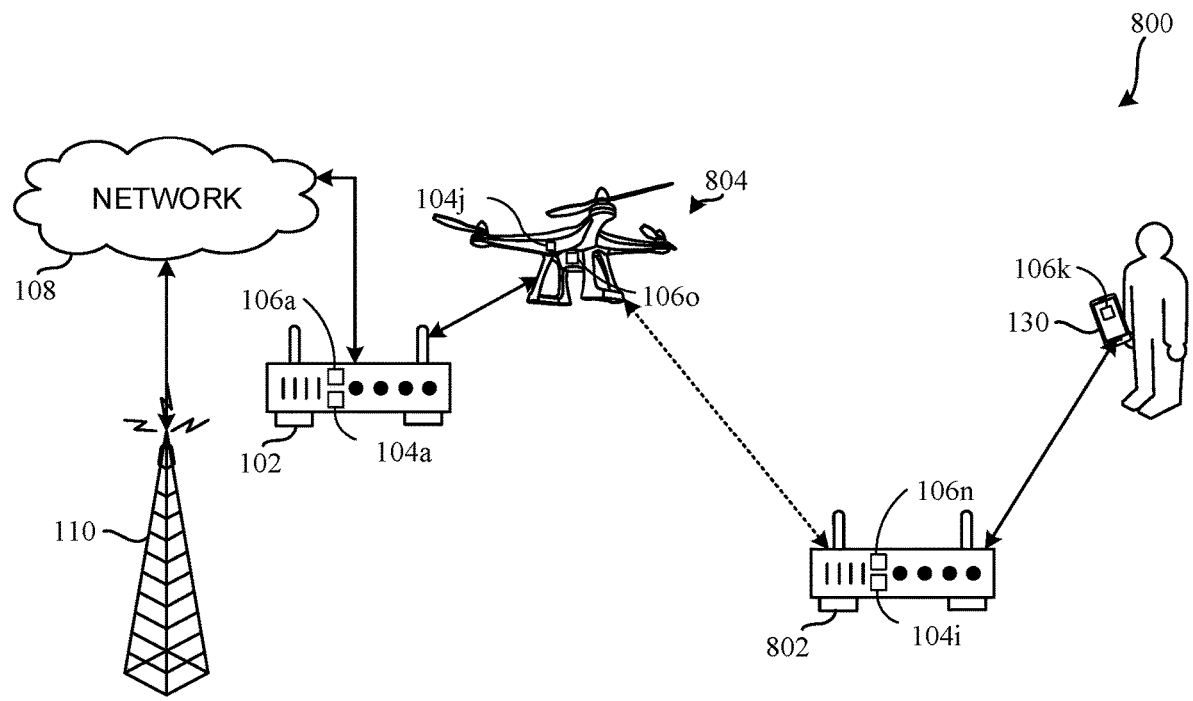
FIG. 8 is an illustration of an example environment including an alternative example drone swarm including the example control center, an additional example access point, and an additional example access drone.

FIG. 8 is an illustration of an example environment 800 including an alternative example drone swarm including the example control center 102, an example access point 802, and an example access drone 804. The example environment 800 additionally includes the example network 108, the example base station 110, and the example fifth user equipment 130 of FIG. 1. The example control center 102 includes the example radio architecture 106a and the example drone swarm controller 104a. The example access point 802 includes an example radio architecture 106n and an example drone swarm controller 104i. The example access drone 804 includes an example radio architecture 106o and an example drone swarm controller 104j. In the illustrated example, the example control center 102 is communicatively coupled to the example network 108, the example access drone 804. In the illustrated example, the example access drone 804 is temporarily communicatively coupled to the example access point 802. In other examples, the example access drone 804 is collocated with the example access point 802. In the illustrated example, the example base station 110 is communicatively coupled to the example network 108. In the illustrated example, the example access point 802 is communicatively coupled to the example fifth user equipment 130.

In the illustrated example of FIG. 8, the example access drone 804 operates using multiple physical layers. That is the example radio architecture 106o supports communication over multiple communication mediums (e.g., LTE RAT, mmWave RAT, etc.). In such an example, a first communication medium (e.g., mmWave) is more advantageous than a second communication medium (e.g., LTE) for network communication but has a shorter distance range than the second communication medium. In the illustrated example, the example access point 802 operates based on the second communication medium.

In the illustrated example of FIG. 8, the example drone swarm controller 104a transmits a first signal the example access drone 804. The first signal causes the access drone 804 to start a discovery process of user equipment in the example environment 800. In response to the first signal, the example access drone 804 queries the example fifth user equipment 130 for one or more values via the example access point 802. In response to the first signal and upon receiving the one or more values from the example user equipment 130 via the example access point 802, the example access drone 804 transmits the one or more values, a position of the example access drone 804 in the environment 800, and an identifier of the example access drone 804 to the example drone swarm controller 104a.

In the illustrated example of FIG. 8, the example drone swarm controller 104a determines a position of the example access drone 804 to optimize a connection to be made between the example fifth user equipment 130 and the example control center 102 (e.g., a first communication medium). The example drone swarm controller 104*a* transmits a second signal to the example access drone 804. The second signal is to cause the example access drone 804 to regulate the position of the example access drone 804 to establish a connection between the example fifth user equipment 130 and the example control center 102 (e.g., the first communication medium). The second signal additionally causes the example access drone 804 to query the example fifth user equipment 130 for the one or more values. In the illustrated example, the example access drone 804 facilitates communication between the example fifth user equipment 130 and the example control center 102.

Figure 9:
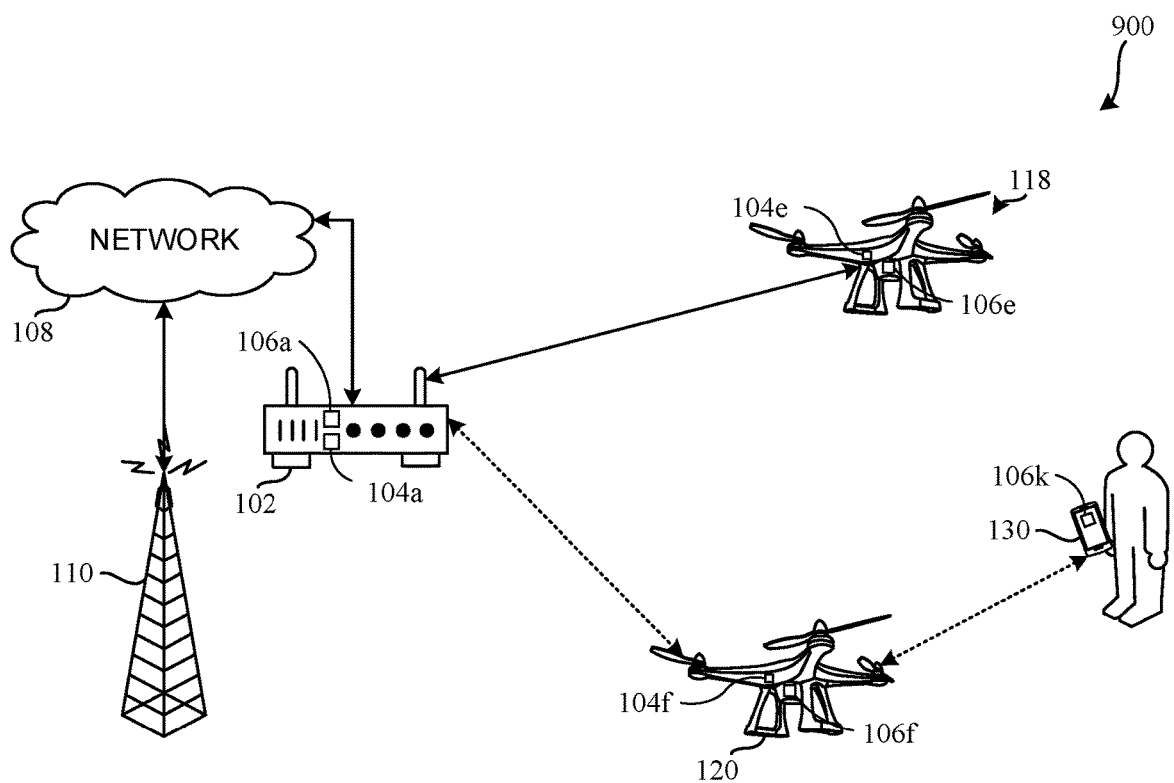
FIG. 9 is an illustration of an example environment including an alternative example drone swarm including the example control center, the example access drone, and the example discovery drone of FIG. 1.

FIG. 9 is an illustration of an example environment 900 including an alternative example drone swarm including the example control center 102, the example access drone 118, and the example discovery drone 120 of FIG. 1. The example environment 900 additionally includes the example network 108, the example base station 110, and the example fifth user equipment 130 of FIG. 1. The example control center 102 includes the example radio architecture 106*a* and the example drone swarm controller 104*a*. The example access drone 118 includes the example radio architecture 106*e* and the example drone swarm controller 104*e*. The example discovery drone 120 includes the example radio architecture 106*f* and the example drone swarm controller 104*f* In the illustrated example, the example control center 102 is communicatively coupled to the example network 108 and the example access drone 118. In the illustrated example, the example control center 102 is temporarily communicatively coupled to the example discovery drone 120. In the illustrated example, the example base station 110 is communicatively coupled to the example network 108. In the illustrated example, the example discovery drone 120 is temporarily communicatively coupled to the example fifth user equipment 130.

In the illustrated example of FIG. 9, the example fifth user equipment 130 is outside of the example network 108. In such an example, the fifth user equipment 130 is not connected to any other networks. In other examples, the example fifth user equipment 130 is communicatively coupled to a second network different than the example network 108.

In the illustrated example of FIG. 9, the example drone swarm controller 104*a* transmits a first signal to the example discovery drone 120 to cause the example discovery drone 120 to start a discovery process of user equipment in the example environment 900. The first signal causes the example discovery drone 120 to start a discovery process of user equipment in the example environment 900. In response to the first signal, the example discovery drone 120 navigates throughout the environment 900 and queries the example fifth user equipment 130 for one or more values via a discovery signal after disconnecting from the example drone swarm controller 104*a*. In such an example, the first signal indicates the position of the example drone swarm controller 104*a* is less than a threshold distance from the example sensor node 114. For example, the example sensor node 114 is capable of receiving signals via longer distance radio architecture (e.g., LTE RAT) (e.g., has a larger propagation distance), but it is only capable of transmitting over short distance radio architecture (e.g., Wi-Fi RAT). In response to the first signal, the example discovery drone 120 transmits the one or more values, a position of the example discovery drone 120 in the environment 900, and an identifier of the example discovery drone 120 to the example drone swarm controller 104*a*.

In the illustrated example of FIG. 9, the example drone swarm controller 104*a* determines one or more positions of the example discovery drone 120 and the example access drone 118 to optimize a connection to be made between the example fifth user equipment 130 and the example network 108. The example drone swarm controller 104*a* transmits a second signal to one or more of the example discovery drone 120 and the example access drone 118. The second signal is to cause the example access drone 118 to regulate the position of the example access drone 118 to establish a connection between the example fifth user equipment 130 and the example network 108. The second signal is to cause the example discovery drone 120 to start a discovery process of user equipment in the example environment 900. The second signal also causes the example access drone 118 to start a discovery process of the example fifth user equipment 130. In the illustrated example, the example access drone 118 facilitates communication between the example fifth user equipment 130 and the example control center 102.

Figure 10:
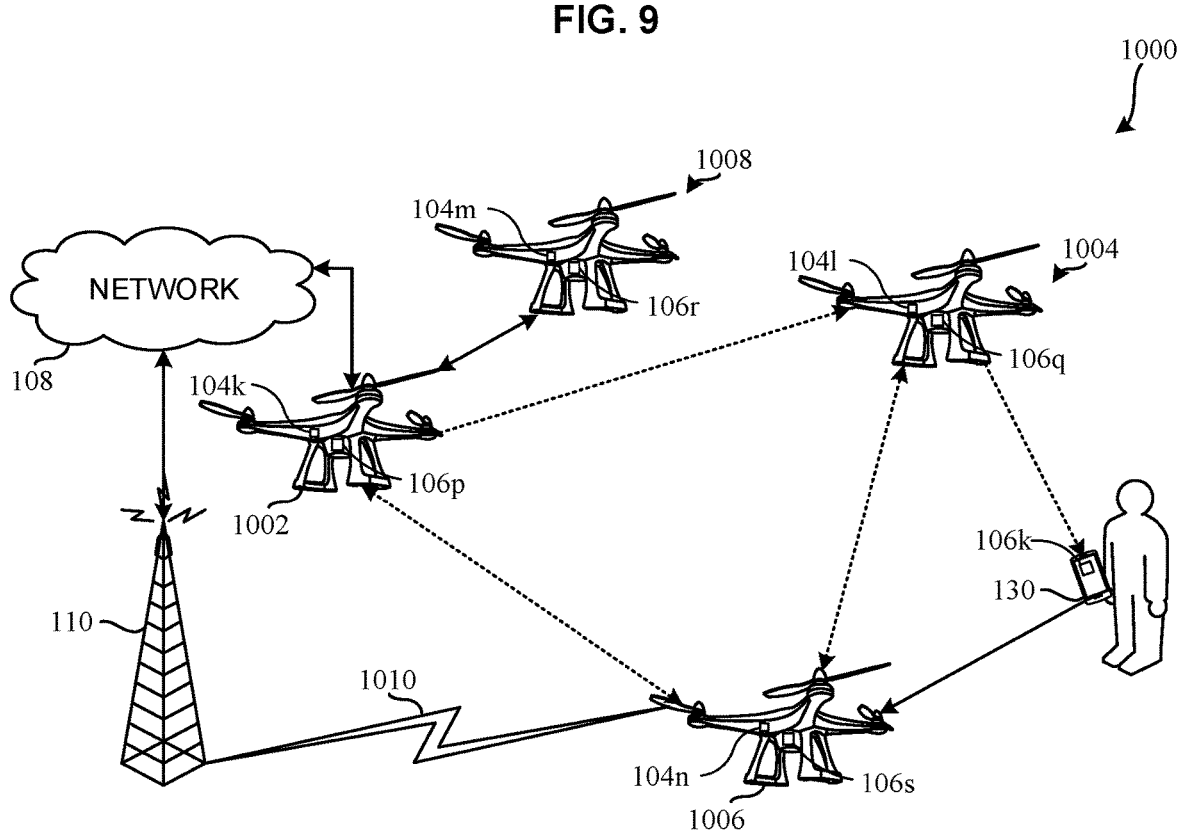
FIG. 10 is an illustration of an example environment including an alternative example drone swarm including an additional example control center, an additional example discovery drone, and an example first access drone, and an example second access drone.

FIG. 10 is an illustration of an example environment 1000 including an alternative example drone swarm including an example control center 1002, an example discovery drone 1004, and an example first access drone 1006, and an example second access drone 1008. The example environment 1000 additionally includes the example network 108, the example base station 110, and the example fifth user equipment 130 of FIG. 1. The example control center 1002 includes an example radio architecture 106*p* and an example drone swarm controller 104*k*. The example discovery drone 1004 includes an example radio architecture 106*q* and an example drone swarm controller 104*l*. The example first access drone 1006 includes an example radio architecture 106*s* and an example drone swarm controller 104*n*. The example second access drone 1008 includes an example radio architecture 106*r* and the example drone swarm controller 104*m*.

In the illustrated example of FIG. 10, the example control center 1002 is communicatively coupled to the example network 108 and the example second access drone 1008. In the illustrated example, the example control center 1002 is temporarily communicatively coupled to the example discovery drone 1004. In the illustrated example, the example control center 1002 is temporarily communicatively coupled to the example first access drone 1006. In other examples, the example control center 1002 is collocated with the example first access drone 1006. In the illustrated example, the example discovery drone 1004 is temporarily communicatively coupled to the example first access drone 1006. In other examples, the example discovery drone 1004 is collocated with the example first access drone 1006. In the illustrated example, the example discovery drone 1004 is temporarily communicatively coupled example fifth user equipment 130. In the illustrated example, the example fifth user equipment is communicatively coupled to the example first access drone 1006. In the illustrated example, the example base station 110 is communicatively coupled to the example network 108. In the illustrated example, the example first access drone 1006 is communicatively coupled to the example base station via an example communication link 1010.

In the illustrated example of FIG. 10, the example control center 1002 and the example second access drone 1008 operates based on a first radio architecture (e.g., radio architecture 106*p*, radio architecture 106*r*). For example, the first radio architecture is a first communication medium (e.g., UMTS, GSM, Wi-Fi, etc.). In the illustrated example of FIG. 10, the example first access point 1006 operates based on a second radio architecture (e.g., radio architecture 106s). For example, the second radio architecture is a second communication medium, different from the first communication medium (e.g., LTE, EDGE, etc.). In the example, the example fifth user equipment 130 is communicatively coupled to the example network 108 via the example first access point 1006.

In the illustrated example of FIG. 10, the example drone swarm controller 104k transmits a first signal to the example discovery drone 1004 to cause the example discovery drone 1004 to start a discovery process of user equipment in the example environment 1000. The first signal causes the example discovery drone 1004 to start a discovery process of user equipment in the example environment 1000. In response to the first signal, the example discovery drone 1004 navigates throughout the environment 1000 and queries the example fifth user equipment 130 for one or more values via a discovery signal after disconnecting from the example drone swarm controller 104k. In such an example, the discovery signal indicates the position of the example discovery drone 1004 is greater than a threshold distance from the example fifth user equipment 130. For example, the example fifth user equipment is capable of receiving signals via longer distance radio architecture (e.g., LTE RAT) (e.g., has a larger propagation distance), but it is only capable of transmitting over short distance radio architecture (e.g., Wi-Fi RAT). In such an example, the example first access drone 1006 is within the threshold distance corresponding to the example fifth user equipment 130.

In response to the discovery signal, the example fifth user equipment 130 transmits the one or more values to the example first access drone 1006. In response to receiving the one or more values from the example fifth user equipment 130, the example first access drone 1006 transmits the one or more values, a position of the example discovery drone 1004 in the environment 1000, and an identifier of the example discovery drone 1004 to the example drone swarm controller 104k. The example first access drone 1006 obtains the position of the example discovery drone 1004 in the environment 1000 and the identifier of the example discovery drone 1004 via the temporary communication between the example first access drone 1006 and the example discovery drone 1004.

In the illustrated example of FIG. 10, the example drone swarm controller 104k determines one or more positions of the example discovery drone 1004, the example first access drone 1006, and the example second access drone 1008 to optimize a connection to be made between the example fifth user equipment 130 and the example control center 1002 and one or more connections between the example network 108 and other user equipment in the environment 1000, the connections facilitated by the example first access drone 1006. The example drone swarm controller 104k transmits a second signal to one or more of the example discovery drone 1004, the example first access drone 1006, and the example second access drone 1008. The second signal is to cause the example second access drone 1008 to regulate the position of the example second access drone 1008 to establish a connection between the example fifth user equipment 130 and the example control center 1002. The second signal is to cause the example discovery drone 1004 to start a discovery process of user equipment in the example environment 1000 and cause the example first access drone 1006 to facilitate communication between additional user equipment and the example network 108 via the second communication medium. The second signal also causes the example second access drone 1008 to start a discovery process of the example fifth user equipment 130. In the illustrated example, the example second access drone 1008 facilitates communication between the example fifth user equipment 130 and the example control center 1002.

While an example manner of implementing one of the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104h, the example drone swarm controller 104i, the example drone swarm controller 104j, the example drone swarm controller 104k, the example drone swarm controller 104l, the example drone swarm controller 104m, the example drone swarm controller 104n of FIGS. 1, 3, 4, 5, 6, 7, 8, 9, and 10 is illustrated in FIG. 2, one or more of the elements, processes and/or devices illustrated in FIG. 2 may be combined, divided, re-arranged, omitted, eliminated and/or implemented in any other way. Further, the example data manager 200, the example utility function determiner 202, the example navigation dispatcher 204 and/or, more generally, the one of the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104h, the example drone swarm controller 104i, the example drone swarm controller 104j, the example drone swarm controller 104k, the example drone swarm controller 104l, the example drone swarm controller 104m, the example drone swarm controller 104n of FIGS. 1, 3, 4, 5, 6, 7, 8, 9, and 10 may be implemented by hardware, software, firmware and/or any combination of hardware, software and/or firmware. Thus, for example, any of the example data manager 200, the example utility function determiner 202, the example navigation dispatcher 204 and/or, more generally, the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104h, the example drone swarm controller 104i, the example drone swarm controller 104j, the example drone swarm controller 104k, the example drone swarm controller 104l, the example drone swarm controller 104m, the example drone swarm controller 104n could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data manager 200, the example utility function determiner 202, the example navigation dispatcher 204 and/or the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* is/are hereby expressly defined to include a non-transitory computer readable storage device or storage disk such as a memory, a digital versatile disk (DVD), a compact disk (CD), a Blu-ray disk, etc. including the software and/or firmware. Further still, the example drone swarm controller 104*a*, the example drone swarm controller 104*b*, the example drone swarm controller 104*c*, the example drone swarm controller 104*d*, the example drone swarm controller 104*e*, the example drone swarm controller 104*f*, the example drone swarm controller 104*g*, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* of FIGS. 1, 3, 4, 5, 6, 7, 8, 9, and 10 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
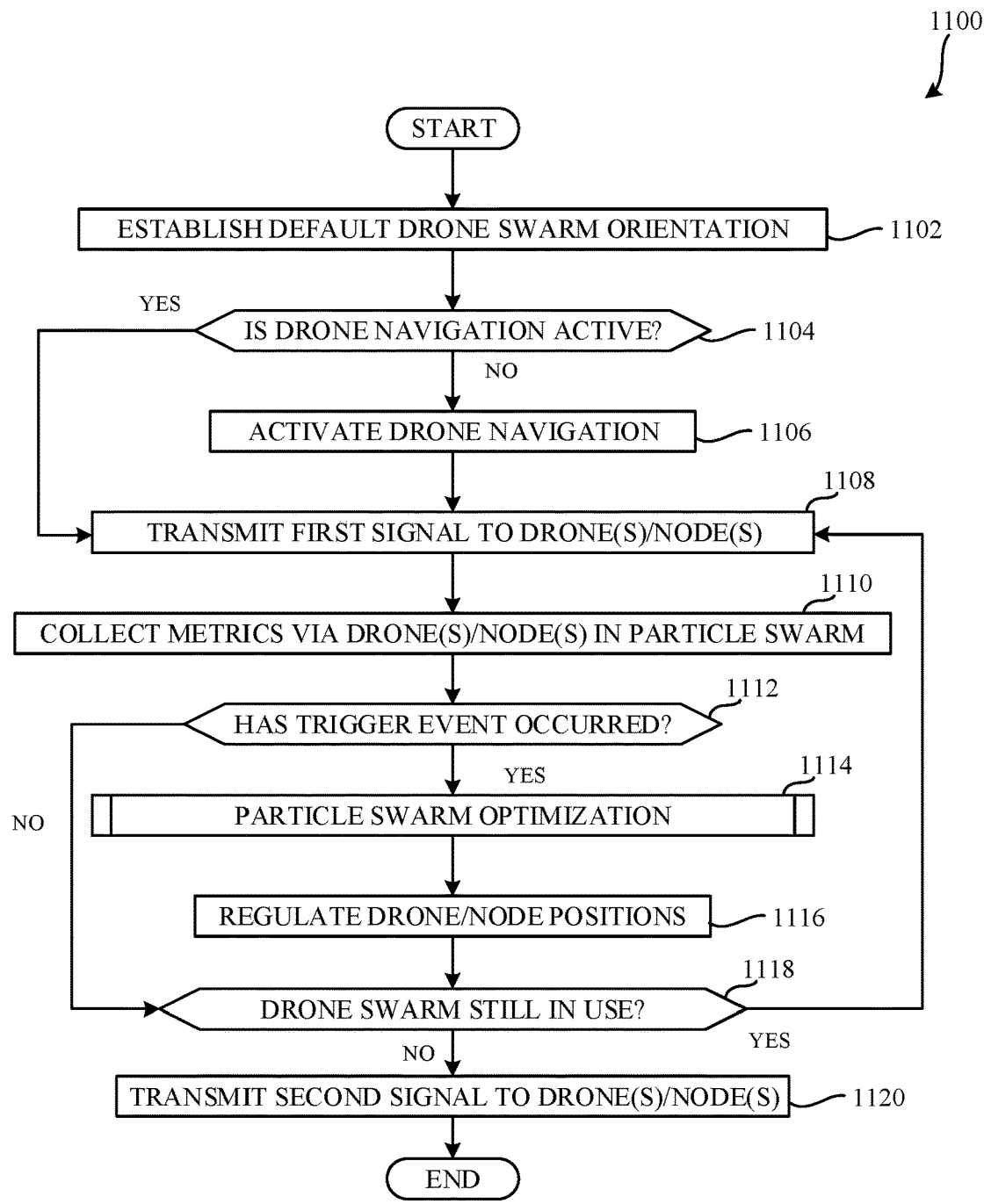
FIG. 11 is a flowchart representative of machine readable instructions which may be executed to implement the example drone swarm controller of FIG. 2.

A flowchart representative of example hardware logic, machine readable instructions, hardware implemented state machines, and/or any combination thereof for implementing the one of the example drone swarm controller 104*a*, the example drone swarm controller 104*b*, the example drone swarm controller 104*c*, the example drone swarm controller 104*d*, the example drone swarm controller 104*e*, the example drone swarm controller 104*f*, the example drone swarm controller 104*g*, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* of FIGS. 1, 3, 4, 5, 6, 7, 8, 9, and 10 is shown in FIG. 11. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIG. 11, many other methods of implementing the example one of the example drone swarm controller 104*a*, the example drone swarm controller 104*b*, the example drone swarm controller 104*c*, the example drone swarm controller 104*d*, the example drone swarm controller 104*e*, the example drone swarm controller 104*f*, the example drone swarm controller 104*g*, the example drone swarm controller 104*h*, the example drone swarm controller 104*i*, the example drone swarm controller 104*j*, the example drone swarm controller 104*k*, the example drone swarm controller 104*l*, the example drone swarm controller 104*m*, the example drone swarm controller 104*n* may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 11 and 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

FIG. 11 is a flowchart representative of machine readable instructions which may be executed to implement the example one of the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104h, the example drone swarm controller 104i, the example drone swarm controller 104j, the example drone swarm controller 104k, the example drone swarm controller 104l, the example drone swarm controller 104m, the example drone swarm controller 104n of FIG. 2.

The example program 1100 of FIG. 11 begins at block 1102 where the example navigation dispatcher 204 of FIG. 2 establishes a default drone swarm orientation. For example, the example navigation dispatcher 204 the example navigation dispatcher 204 transmits a signal to one or more of the example initiator node 112, the example sensor node 114, the example measurement collection node 116, the example access drone 118, and the example discovery drone 120 to establish a default orientation of the drone swarm. Next, at block 1104, the example navigation dispatcher 204 determines whether individual drone navigation is active. If individual drone navigation is not active (block 1104: NO), the example navigation dispatcher 204 activates drone navigation for each of the example initiator node 112, the example sensor node 114, the example measurement collection node 116, the example access drone 118, and the example discovery drone 120 at block 1106. If individual drone navigation is active (block 1104: YES), the example program 1100 proceeds to block 1108. At block 1108, the example data manager 200 sends a first signal to one or more of the example initiator node 112, the example sensor node 114, and the example discovery drone 120 to cause the example initiator node 112, the example sensor node 114, and the example discovery drone 120 to start a discovery process of user equipment, other nodes, and/or drones in an environment.

At block 1110, the example data manager 200 collects one or more values corresponding to user equipment via one or more of the example initiator node 112, the example sensor node 114, the example measurement collection node 116, the example access drone 118, and the example discovery drone 120. At block 1112, the example utility function determiner 202 determines whether a trigger event has occurred, the trigger event corresponding to the one or more values. If the example utility function determiner 202 determines that the trigger event has occurred (block 1112: YES), the example utility function determiner 202 runs a particle swarm optimization algorithm at block 1114. For example, the example utility function determiner 202 determines one or more positions of the example initiator node 112, the example sensor node 114, the example measurement collection node 116, the example access drone 118, and the example discovery drone 120 in the environment 100, the one or more positions corresponding to an orientation of that drone swarm that optimizes a utility function according to the particle swarm optimization algorithm. If the example utility function determiner 202 determines that the trigger event has not occurred (block 1112: NO), the program 1100 proceeds to block 1118. At block 1116, the example navigation dispatcher 204 regulates drone and node positions for one or more drones and/or nodes that the navigation dispatcher 204 is communicatively coupled to. For example, the example navigation dispatcher transmits a signal to one or more of the example initiator node 112, the example sensor node 114, the example measurement collection node 116, the example access drone 118, and the example discovery drone 120, the signal to cause the example initiator node 112, the example sensor node 114, the example measurement collection node 116, the example access drone 118, and the example discovery drone 120 to regulate the one or more positions to establish and/or maintain one or more connections between user equipment in the environment 100 and the example network 108.

At block 1118, the example data manager 200 determines whether the drone swarm is still in use. For example, the example data manager 200 determines, based on the one or more values whether the user equipment, other nodes, and/or drones are still accessing the example network 108 via one or more of the example initiator node 112, the example sensor node 114, the example measurement collection node 116, the access drone 118, and the example discovery drone 120. If the example data manger 200 determines that the drone swarm is still in use (block 1118: YES), the program 1100 proceeds to block 1108. If the example data manger 200 determines that the drone swarm is not still in use (block 1118: NO), the example navigation dispatcher 204 transmits a signal to the example initiator node 112, the example sensor node 114, the example measurement collection node 116, the example access drone 118, and the example discovery drone 120 to return to a preset location at block 1120. After block 1120, the example program 1100 ends.

Figure 12:
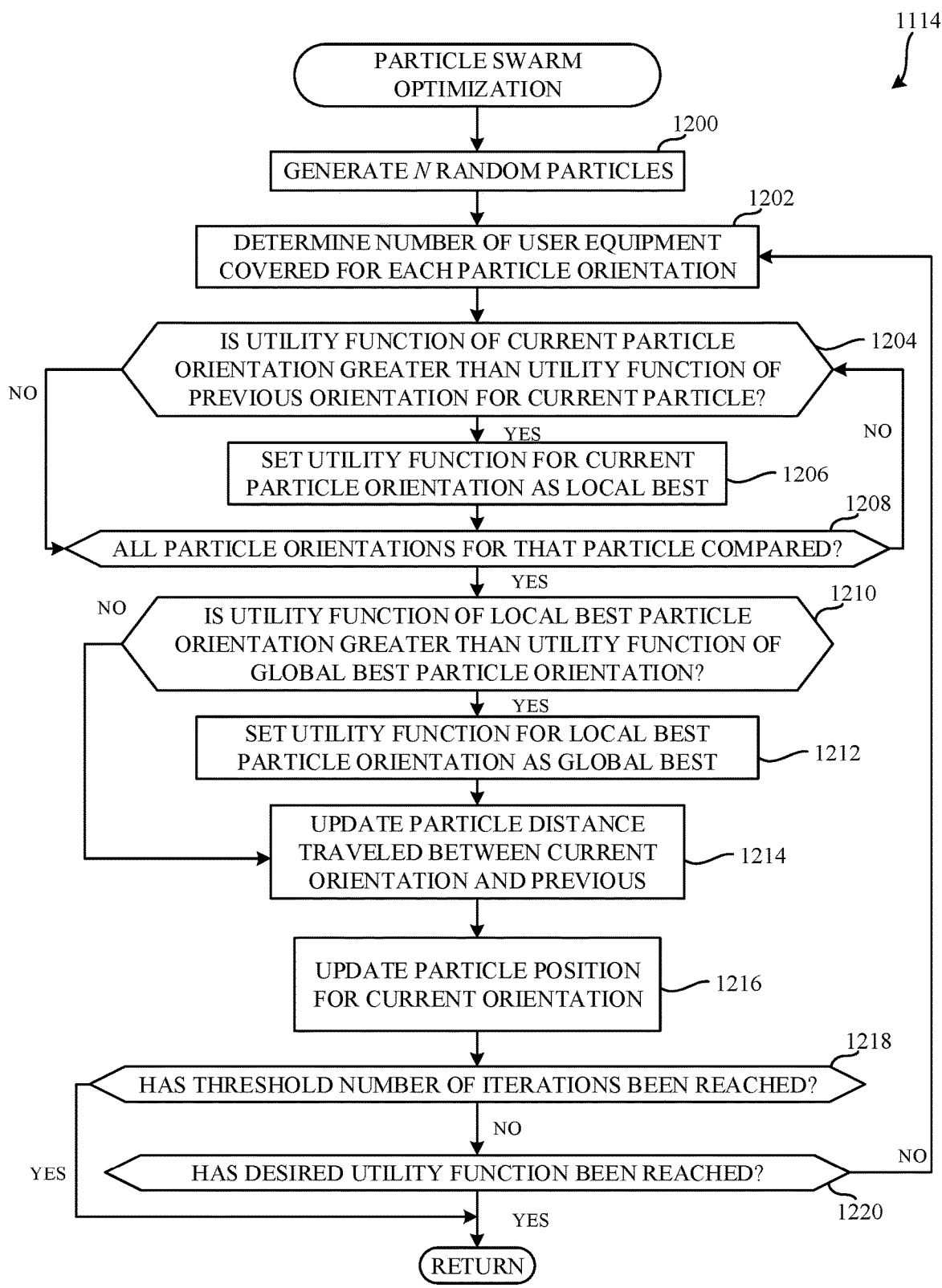
FIG. 12 is a flowchart representative of machine readable instruction which may be executed to implement the example utility function determiner of FIG. 2 to run an particle swarm optimization algorithm.

FIG. 12 is a flowchart representative of machine readable instruction which may be executed to implement the example utility function determiner 202 of FIG. 2 to run the particle swarm optimization algorithm at block 1114 of the program 1100 of FIG. 11. The sub-program of block 1114 begins at block 1200 where the example utility function determiner 202 generates a set of N random particles. At block 1202, the example utility function determiner 202 determines a number of user equipment covered for each particle swarm orientation. At block 1204, the example utility function determiner 202 determines whether the value of the utility function for the current particle orientation being evaluated is greater than the value of the utility function for the previous particle orientation that was evaluated. If the utility function determiner 202 determines that the value of the utility function of the current particle orientation being evaluated is greater than the value of the value of the utility function for the particle orientation that was previously evaluated (block 1204: YES), the utility function determiner 202 sets the value for the utility function for the current particle orientation being evaluated as the local best at block 1206. If the utility function determiner 202 determines that the value of the utility function of the current particle orientation being evaluated is not greater than the value of the value of the utility function for the particle orientation that was previously evaluated (block 1204: NO), the utility function determiner 202 determines whether all the particle orientations for the current particle being evaluated have been compared to the local best at block 1208. If the utility function determiner 202 determines that all the particle orientation for the current particle being evaluated have been compared to the local best (block 1208: YES), the utility function determiner 202 determines whether the utility function for the local best particle orientation is greater than the utility function of the global best particle orientation at block 1210. If the utility function determiner 202 that all the particle orientation for the current particle being evaluated have not been compared to the local best (block 1208: NO), the sub-routine of block 1114 proceeds to block 1204.

At block 1210, the example utility function determiner 202 determines whether the value of the utility function for the local best particle orientation is greater than the value of the utility function for the global best particle orientation. If the example utility function determiner 202 determines that the value of the utility function for the local best particle orientation is greater than the value of the utility function for the global best particle orientation (block 1210: YES), the example utility function determiner 202 sets the local best particle orientation as the global best particle orientation at block 1212. If the example utility function determiner 202 determines that the value of the utility function for the local best particle orientation is not greater than the value of the utility function for the global best particle orientation (block 1210: NO), the utility function determiner 202 updates the velocity for the current particle for which the utility function is being determined at block 1214. At block 1216, the utility function determiner 202 updates the position of the particle for which the utility function is being determined.

At block 1218, the utility function determiner 202 determines whether a threshold number of iterations of the particle swarm optimization algorithm have been executed. If the utility function determiner 202 determines that the threshold number of iterations of the particle swarm optimization algorithm have been executed (block 1218: YES), the sub-routine of block 1114 ends. If the utility function determiner 202 determines that the threshold number of iterations of the particle swarm optimization algorithm have not been executed (block 1218: NO), the utility function determiner 202 determines whether a predefined utility function value has been reached at block 1220. If the utility function determiner 202 determines that the predefined utility function value has been reached (block 1220: YES), the sub-routine of block 1114 ends. If the utility function determiner 202 determines that the predefined utility function value has not been reached (block 1220: NO), the sub-routine of block 1114 proceeds to block 1202.

Figure 13:
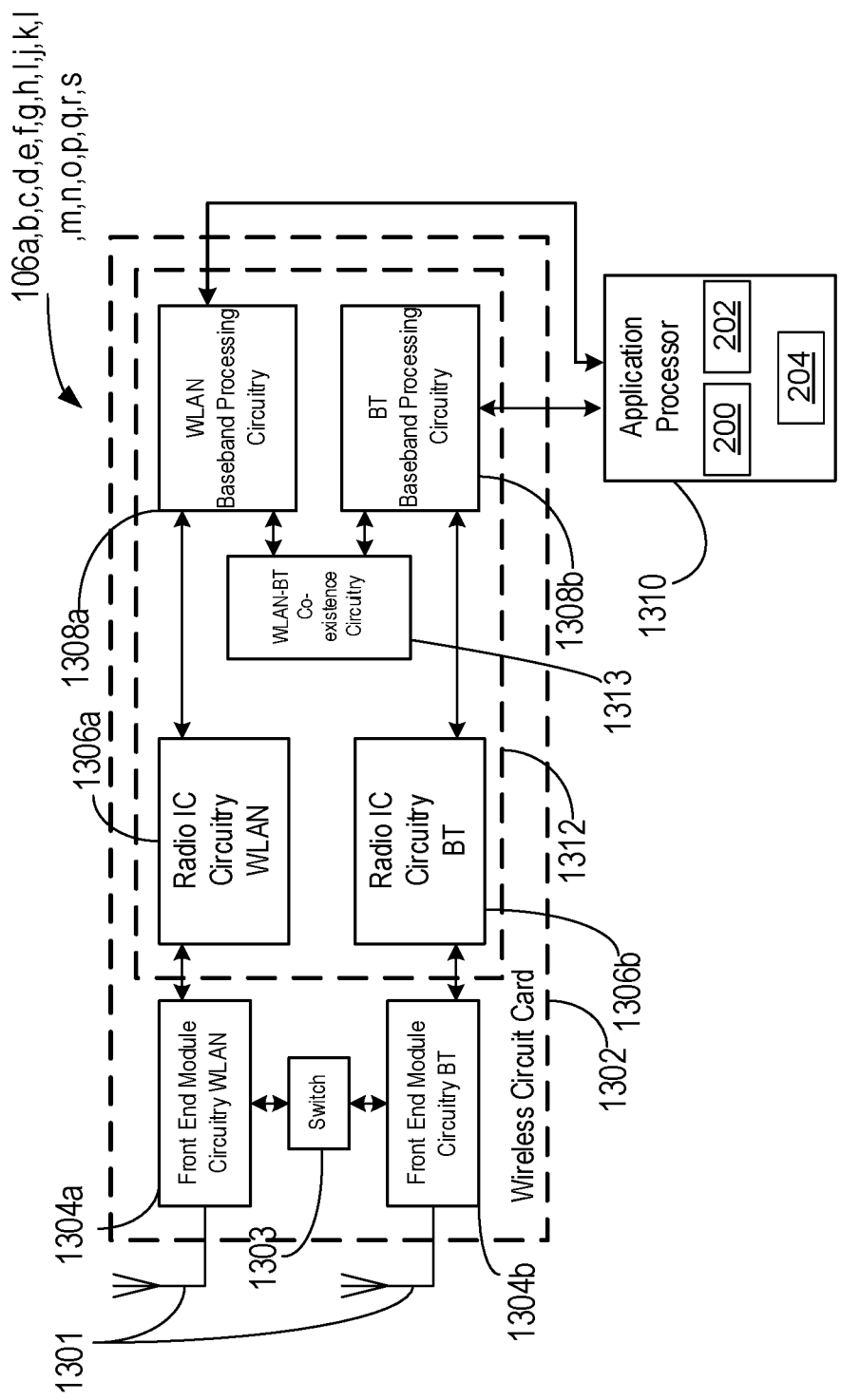
FIG. 13 is a block diagram of a radio architecture in accordance with some examples.
Figure 14:
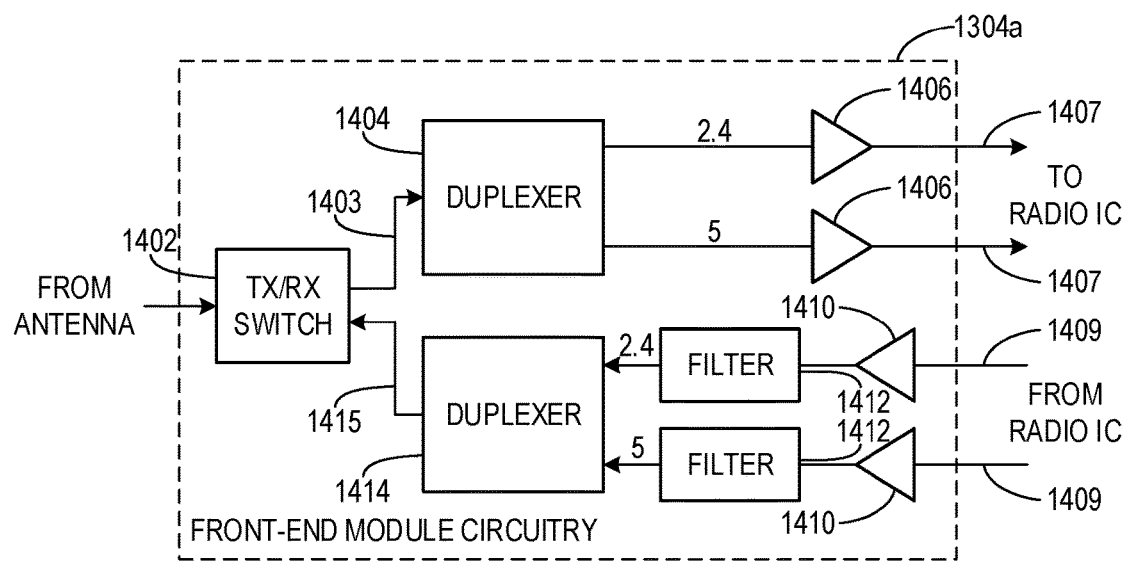
FIG. 14 illustrates an example front-end module circuitry for use in the radio architecture of FIG. 13 in accordance with some examples.

FIG. 14 illustrates an example front-end module circuitry for use in the radio architecture of FIG. 13 in accordance with some examples.

Figure 15:
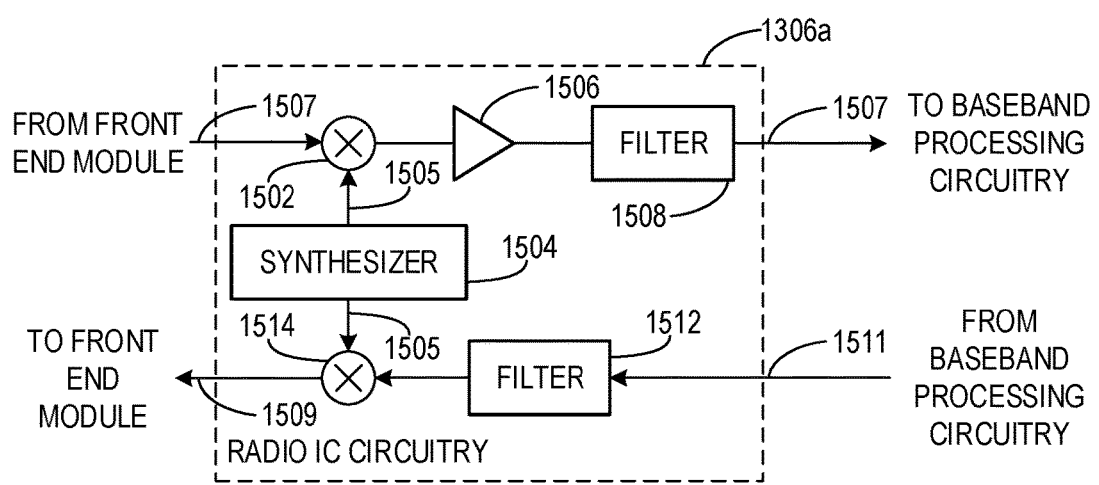
FIG. 15 illustrates an example radio IC circuitry for use in the radio architecture of FIG. 13 in accordance with some examples.

FIG. 15 illustrates an example radio IC circuitry for use in the radio architecture of FIG. 13 in accordance with some examples.

Figure 16:
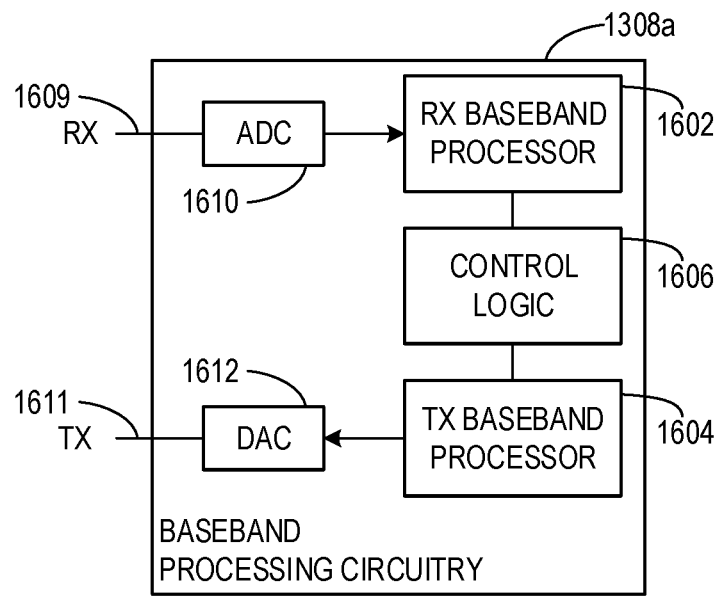
FIG. 16 illustrates an example baseband processing circuitry for use in the radio architecture of FIG. 13 in accordance with some examples.

FIG. 16 illustrates an example baseband processing circuitry for use in the radio architecture of FIG. 13 in accordance with some examples.

FIG. 13 is a block diagram of the radio architecture 106*a*, 106*b*, 106*c*, 106*d*, 106*e*, 106*f*, 106*g*, 106*g*, 106*h*, 106*i*, 106*j*, 106*k*, 106*l*, 106*m*, 106*n*, 106*o*, 106*p*, 106*q*, 106*r*, 106*s* in accordance with some examples. Radio architecture 106*a*, 106*b*, 106*c*, 106*d*, 106*e*, 106*f*, 106*g*, 106*g*, 106*h*, 106*i*, 106*j*, 106*k*, 106*l*, 106*m*, 106*n*, 106*o*, 106*p*, 106*q*, 106*r*, 106*s* may include radio front-end module (FEM) circuitry 1404*a-b*, radio IC circuitry 1406*a-b* and baseband processing circuitry 1408*a-b*. Radio architecture 106*a*, 106*b*, 106*c*, 106*d*, 106*e*, 106*f*, 106*g*, 106*g*, 106*h*, 106*i*, 106*j*, 106*k*, 106*l*, 106*m*, 106*n*, 106*o*, 106*p*, 106*q*, 106*r*, 106*s* as shown includes both WLAN functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1301. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 13, although FEM 1304*a* and FEM 1304*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 13, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry for generation and processing of the baseband signals and for controlling operations of the radio IC circuitry 1306a-b.

Referring still to FIG. 13, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless radio card 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless radio card 1302 may include a WLAN radio card and may be configured for Wi-Fi communications, although the scope of the embodiments is not limited in this respect. In some of these embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 106a, 106b, 106c, 106d, 106e, 106f, 106g, 106g, 106h, 106i, 106j, 106k, 106l, 106m, 106n, 106o, 106p, 106q, 106r, 106s may be part of a Wi-Fi communication station (STA) such as a wireless control center (AP), a base station or a mobile device including a Wi-Fi device. In some of these embodiments, radio architecture 106a, 106b, 106c, 106d, 106e, 106f, 106g, 106g, 106h, 106i, 106j, 106k, 106l, 106m, 106n, 106o, 106p, 106q, 106r, 106s may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 106a, 106b, 106c, 106d, 106e, 106f, 106g, 106g, 106h, 106i, 106j, 106k, 106l, 106m, 106n, 106o, 106p, 106q, 106r, 106s may also be suitable to transmit and/or receive communications in accordance with other techniques and standards.

In some embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured for high-efficiency Wi-Fi (HEW) communications in accordance with the IEEE 802.11ax standard. In these embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured to communicate in accordance with an OFDMA technique, although the scope of the embodiments is not limited in this respect.

In some other embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 16, the BT baseband circuitry 1308b may be compliant with a Bluetooth (BT) connectivity standard such as Bluetooth, Bluetooth 14.0 or Bluetooth 12.0, or any other iteration of the Bluetooth Standard. In embodiments that include BT functionality as shown for example in FIG. 13, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured to establish a BT synchronous connection oriented (SCO) link and or a BT low energy (BT LE) link. In some of the embodiments that include functionality, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 13, the functions of a BT radio card and WLAN radio card may be combined on a single wireless radio card, such as single wireless radio card 1302, although embodiments are not so limited, and include within their scope discrete WLAN and BT radio cards In some embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may include other radio cards, such as a cellular radio card configured for cellular (e.g., 3GPP such as LTE, LTE-Advanced or 5G communications).

In some IEEE 802.11 embodiments, the radio architecture 106a, 106b, 106c, 106d, 106e, 106f, 106g, 106g, 106h, 106i, 106j, 106k, 106l, 106m, 106n, 106o, 106p, 106q, 106r, 106s may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

FIG. 14 illustrates WLAN FEM circuitry 1304a in accordance with some embodiments. Although the example of FIG. 14 is described in conjunction with the WLAN FEM circuitry 1304a, the example of FIG. 14 may be described in conjunction with the example BT FEM circuitry 1304b (FIG. 13), although other circuitry configurations may also be suitable.

In some embodiments, the FEM circuitry 1304a may include a TX/RX switch 1402 to switch between transmit mode and receive mode operation. The FEM circuitry 1304a may include a receive signal path and a transmit signal path. The receive signal path of the FEM circuitry 1304a may include a low-noise amplifier (LNA) 1406 to amplify received RF signals 1403 and provide the amplified received RF signals 1407 as an output (e.g., to the radio IC circuitry 1306a-b (FIG. 13)). The transmit signal path of the circuitry 1304a may include a power amplifier (PA) to amplify input RF signals 1409 (e.g., provided by the radio IC circuitry 1306a-b), and one or more filters 1312, such as band-pass filters (BPFs), low-pass filters (LPFs) or other types of filters, to generate RF signals 1315 for subsequent transmission (e.g., by one or more of the antennas 1301 (FIG. 13)) via an example duplexer 1314.

In some dual-mode embodiments for Wi-Fi communication, the FEM circuitry 1304a may be configured to operate in either the 2.4 GHz frequency spectrum or the 12 GHz frequency spectrum. In these embodiments, the receive signal path of the FEM circuitry 1304a may include a receive signal path duplexer 1404 to separate the signals from each spectrum as well as provide a separate LNA 1406 for each spectrum as shown. In these embodiments, the transmit signal path of the FEM circuitry 1304a may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 13). In some embodiments, BT communications may utilize the 2.4 GHz signal paths and may utilize the same FEM circuitry 1304a as the one used for WLAN communications.

FIG. 15 illustrates radio IC circuitry 1306a in accordance with some embodiments. The radio IC circuitry 1306a is one example of circuitry that may be suitable for use as the WLAN or BT radio IC circuitry 1306a/1306b (FIG. 13), although other circuitry configurations may also be suitable. Alternatively, the example of FIG. 15 may be described in conjunction with the example BT radio IC circuitry 1306b.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, up-conversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 15 illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 13) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 13) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304a-b. The baseband signals 1411 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer

1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1507 from FIG. 14 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 15). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 14) may comprise a balanced signal, although the scope of the embodiments is not limited in this respect. The I and Q baseband output signals may be provided to low-noise amplifier, such as amplifier circuitry 1506 (FIG. 15) or to filter circuitry 1508 (FIG. 15).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either the baseband processing circuitry 1308*a-b* (FIG. 13) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. In some examples, the example application processor 1310 implements the example data manager 200, the example utility function determiner 202, and the example navigation dispatcher 204 of FIG. 2.

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

FIG. 16 illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 13), although other circuitry configurations may also be suitable. Alternatively, the example of FIG. 16 may be used to implement the example BT baseband processing circuitry 1308*b* of FIG. 13.

The baseband processing circuitry 1308*a* may include a receive baseband processor (RX BBP) 1602 for processing receive baseband signals 1509 provided by the radio IC circuitry 1306*a-b* (FIG. 13) and a transmit baseband processor (TX BBP) 1604 for generating transmit baseband signals 1411 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 13, in some embodiments, the antennas 1301 (FIG. 13) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 106a, 106b, 106c, 106d, 106e, 106f, 106g, 106g, 106h, 106i, 106j, 106k, 106l, 106m, 106n, 106o, 106p, 106q, 106r, 106s is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 17:
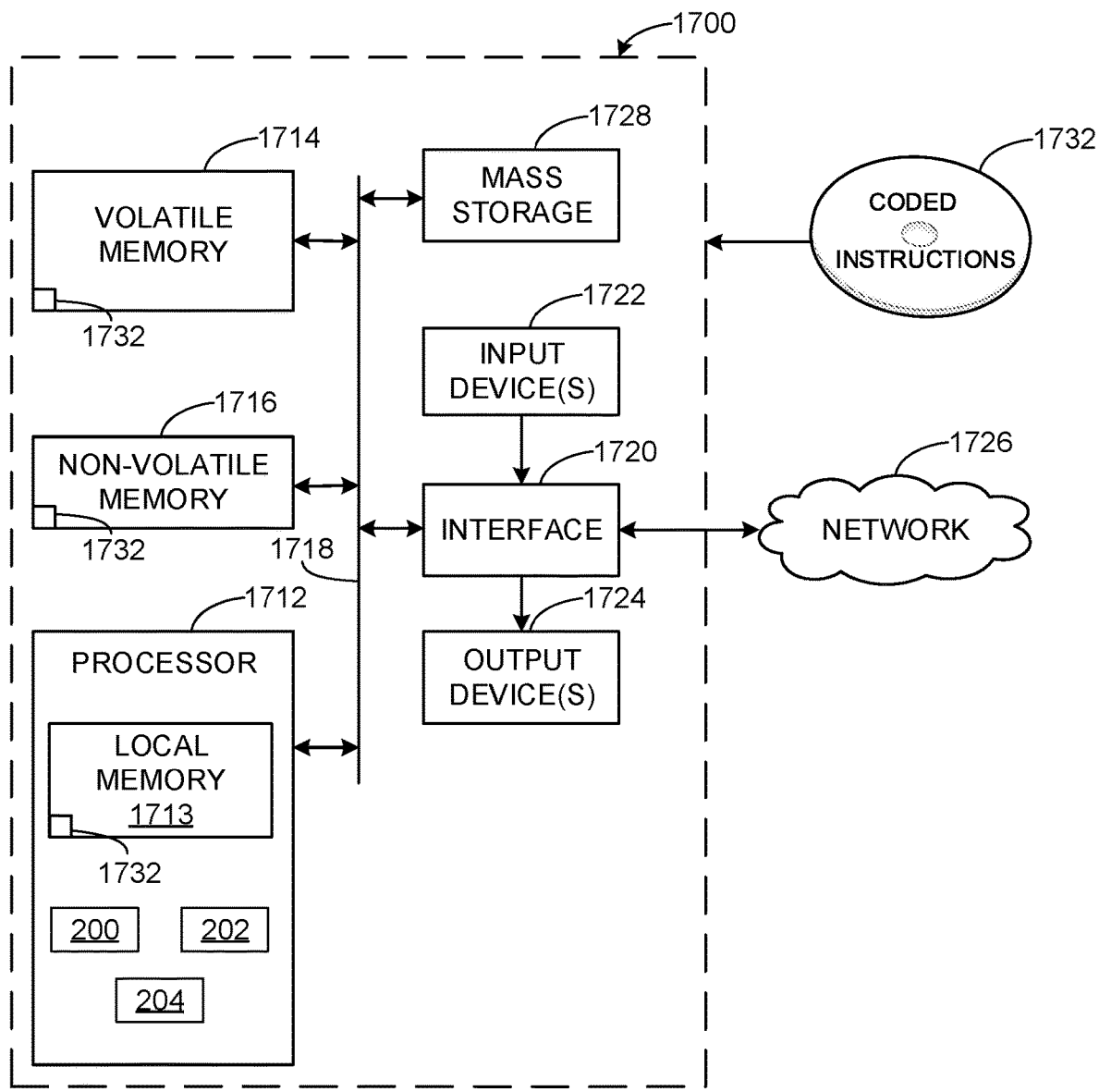
FIG. 17 is a block diagram of an example processing platform structured to execute the instructions of FIG. 11 to implement the example drone swarm controller of FIG. 2.

FIG. 17 is a block diagram of an example processor platform 1000 structured to execute the instructions of FIGS. 11 and 12 to implement the one of the example drone swarm controller 104a, the example drone swarm controller 104b, the example drone swarm controller 104c, the example drone swarm controller 104d, the example drone swarm controller 104e, the example drone swarm controller 104f, the example drone swarm controller 104g, the example drone swarm controller 104h, the example drone swarm controller 104i, the example drone swarm controller 104j, the example drone swarm controller 104k, the example drone swarm controller 104l, the example drone swarm controller 104m, the example drone swarm controller 104n of FIG. 2 The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data manager 200, the example utility function determiner 202, and the example navigation dispatcher 204.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless control center, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 11 and 12 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus and articles of manufacture have been disclosed that provide a framework for collecting one or more values specific to a utility function for an application. The framework as disclosed herein allows for increased network connectivity for user equipment in an environment that is not currently connected to any network or for user equipment that is currently connected to a first network that is unsatisfactory to for the throughput needs of the user equipment. The example methods, apparatus and articles of manufacture disclosed herein allow for a discovery process that can be used to track user equipment without the purpose of providing a wireless network. In a wildlife monitoring application, the user equipment may be livestock. In an environmental study the user equipment may be an animal to be studied (e.g., an endangered bird, a whale, etc.). In a surveillance application, the user equipment may be a person of interest (e.g., a person to protect). The disclosed methods, apparatus and articles of manufacture improve the efficiency of using a computing device by reducing the power consumed by user equipment when operating in an ineffective network. Additionally, the disclosed methods, apparatus, and articles of manufacture improve the efficiency of using a computing device by allowing the device to connect to a network where a network was previously not present. In other words, the disclosed methods, apparatus, and articles of manufacture allow computing devices in areas with no network connectivity to connect to a network by adaptively forming a network around the computing device and adaptively regulating the position of one or more drones included in the network to improve the network connectivity of the computing device. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a data manager to:
transmit a first signal to a discovery drone, the first signal to cause the discovery drone to discover user equipment in an environment, the user equipment outside of a first network including a first drone;
collect one or more values corresponding to the user equipment;
transmit a second signal via a first communication medium to a sensor node, the second signal to cause the sensor node to obtain the one or more values corresponding to the user equipment and transmit the one or more values, an identifier of the sensor node, and a position of the sensor node in the environment to the data manager via the first communication medium, the first communication medium having a larger propagation distance than a second communication medium associated with the first network; and
a utility function determiner to, in response to a trigger event corresponding to the one or more values, determine a first position of the first drone in the environment; and
a navigation dispatcher to transmit a third signal to the first drone, the third signal to cause the first drone to regulate the first position to establish one or more connections between the user equipment and the first network.

2. An apparatus comprising:
a data manager to:
transmit a first signal to a discovery drone, the first signal to cause the discovery drone to discover user equipment in an environment, the user equipment outside of a first network including a first drone; and
collect one or more values corresponding to the user equipment;
a utility function determiner to, in response to a trigger event corresponding to the one or more values, determine a first position of the first drone in the environment;
a navigation dispatcher to transmit a second signal to the first drone, the second signal to cause the first drone to regulate the first position to establish one or more connections between the user equipment and the first network; and
wherein the first signal is to cause the discovery drone to:
navigate throughout the environment;
query user equipment in the environment via a discovery signal, the discovery signal including one or more of a request for the one or more values, a first identifier of the data manager, a second identifier of the discovery drone, a third identifier of the user equipment, a fourth identifier of a measurement collection node, a transmission power of the discovery signal, a first position of the data manager, and a second position of the discovery drone in the environment; and
transmit a fourth signal including the one or more values, the second identifier of the discovery drone, and the second position of the discovery drone in the environment to the data manager after disconnecting from the data manager.

3. The apparatus of claim 2, wherein the first signal includes one or more of the first identifier of the data manager, the fourth identifier of the measurement collection node, the first position of the data manager.

4. The apparatus of claim 3, wherein the one or more values include one or more of the third identifier of the of the user equipment, a third position of the user equipment in the environment, a status of connections to a second network, a timestamp associated with the one or more values, a noise level associated with the connections to the second network, a signal strength associated with the connections to the second network, a signal-to-noise ratio associated with the connections to the second network, and pathloss associated with the connections to the second network.

5. The apparatus of claim 4, wherein the trigger event includes one or more of the status of connections indicating the user equipment is not connected to the second network, the noise level of the connections to the second network not satisfying a first threshold value, the signal strength associated with the connections to the second network not satisfying a second threshold, the signal-to-noise ratio associated with the connections to the second network not satisfying a third threshold, and the pathloss associated with the connections to the second network not satisfying a fourth threshold.

6. The apparatus of claim 4, wherein when the one or more values indicate that the first position of the data manager exceeds a threshold distance between the data manager and the discovery drone, the second signal to cause the discovery drone to transmit a fifth signal including the one or more values, the second identifier of the discovery drone, and the second position of the discovery drone in the environment to the measurement collection node.

7. The apparatus of claim 6, wherein the fifth signal is to cause the measurement collection node to transmit a sixth signal to the data manager, the sixth signal including the one or more values, the second identifier of the discovery drone, and the second position of the discovery drone in the environment.

8. An apparatus comprising:
means for data managing, the data managing means to:
transmit a first signal to a discovery drone, the first signal to cause the discovery drone to discover user equipment in an environment, the user equipment outside of a first network including a first drone; and collect one or more values corresponding to the user equipment;

transmit a second signal via a first communication medium to a sensor node, the second signal to cause the sensor node to obtain the one or more values corresponding to the user equipment and transmit the one or more values, an identifier of the sensor node, and a position of the sensor node in the environment to the data managing means via the first communication medium, the first communication medium having a larger propagation distance than a second communication medium associated with the first network; and means for utility function determining, the utility function determining means to, in response to a trigger event corresponding to the one or more values, determine a first position of the first drone in the environment; and means for navigation dispatching, the navigation dispatching means to transmit a third signal to the first drone, the third signal to cause the first drone to regulate the first position to establish one or more connections between the user equipment and the first network.

9. An apparatus comprising:

means for data managing, the data managing means to:
transmit a first signal to a discovery drone, the first signal to cause the discovery drone to discover user equipment in an environment, the user equipment outside of a first network including a first drone; and
collect one or more values corresponding to the user equipment;

means for utility function determining, the utility function determining means to, in response to a trigger event corresponding to the one or more values, determine a first position of the first drone in the environment;

means for navigation dispatching, the navigation dispatching means to transmit a second signal to the first drone, the second signal to cause the first drone to regulate the first position to establish one or more connections between the user equipment and the first network; and wherein the first signal is to cause the discovery drone to:
navigate throughout the environment;
query user equipment in the environment via a discovery signal, the discovery signal including one or more of a request for the one or more values, a first identifier of the data managing means, a second identifier of the discovery drone, a third identifier of the user equipment, a fourth identifier of a measurement collection node, a transmission power of the discovery signal, a first position of the data managing means, and a second position of the discovery drone in the environment; and
transmit a fourth signal including the one or more values, the second identifier of the discovery drone, and the second position of the discovery drone in the environment to the data managing means after disconnecting from the data managing means.

10. The apparatus of claim 9, wherein the first signal includes one or more of the first identifier of the data managing means, the fourth identifier of the measurement collection node, the first position of the data managing means.

11. The apparatus of claim 10, wherein the one or more values include one or more of the third identifier of the of the user equipment, a third position of the user equipment in the environment, a status of connections to a second network, a timestamp associated with the one or more values, a noise level associated with the connections to the second network, a signal strength associated with the connections to the second network, a signal-to-noise ratio associated with the connections to the second network, and pathloss associated with the connections to the second network.

12. The apparatus of claim 11, wherein the trigger event includes one or more of the status of connections indicating the user equipment is not connected to the second network, the noise level of the connections to the second network not satisfying a first threshold value, the signal strength associated with the connections to the second network not satisfying a second threshold, the signal-to-noise ratio associated with the connections to the second network not satisfying a third threshold, and the pathloss associated with the connections to the second network not satisfying a fourth threshold.

13. The apparatus of claim 10, wherein when the one or more values indicate that the first position of the data managing means exceeds a threshold distance between the data managing means and the discovery drone, the second signal to cause the discovery drone to transmit a fifth signal including the one or more values, the second identifier of the discovery drone, and the second position of the discovery drone in the environment to the measurement collection node.

14. The apparatus of claim 13, wherein the fifth signal is to cause the measurement collection node is to transmit a sixth signal to the data managing means, the sixth signal including the one or more values, the second identifier of the discovery drone, and the second position of the discovery drone in the environment.

15. A non-transitory computer readable storage device comprising instructions that, when executed by at least one processor, cause a machine to at least:

transmit, by executing an instruction with the at least one processor, a first signal from a data management device to a discovery drone, the first signal to cause the discovery drone to discover user equipment in an environment, the user equipment outside of a first network including a first drone; and collect, by executing an instruction with the at least one processor, one or more values at the data management device, the one or more values corresponding to the user equipment;

transmit a second signal via a first communication medium from the data management device to a sensor node, the second signal to cause the sensor node to obtain the one or more values corresponding to the user equipment and transmit the one or more values, an identifier of the sensor node, and a position of the sensor node in the environment to the data management device via the first communication medium, the first communication medium having a larger propagation distance than a second communication medium associated with the first network; and in response to a trigger event corresponding to the one or more values, determine, by executing an instruction with the at least one processor, a first position of the first drone in the environment; and transmit, by executing an instruction with the at least one processor, a third signal to the first drone, the third signal to cause the first drone to regulate the first position to establish one or more connections between the user equipment and the first network.

16. A non-transitory computer readable storage device comprising instructions that, when executed by at least one processor, cause a machine to at least:
- transmit, by executing an instruction with the at least one processor, a first signal from a data management device to a discovery drone, the first signal to cause the discovery drone to discover user equipment in an environment, the user equipment outside of a first network including a first drone; and
- collect, by executing an instruction with the at least one processor, one or more values at the data management device, the one or more values corresponding to the user equipment;
- in response to a trigger event corresponding to the one or more values, determine, by executing an instruction with the at least one processor, a first position of the first drone in the environment;
- transmit, by executing an instruction with the at least one processor, a second signal to the first drone, the second signal to cause the first drone to regulate the first position to establish one or more connections between the user equipment and the first network; and
- wherein the first signal is to cause the discovery drone to:
    - navigate throughout the environment;
    - query user equipment in the environment via a discovery signal, the discovery signal including one or more of a request for the one or more values, a first identifier of the data management device, a second identifier of the discovery drone, a third identifier of the user equipment, a fourth identifier of a measurement collection node, a transmission power of the discovery signal, a first position of the data management device, and a second position of the discovery drone in the environment; and
    - transmit a fourth signal including the one or more values, the second identifier of the discovery drone, and the second position of the discovery drone in the environment to the data management device after disconnecting from the data management device.

17. The non-transitory computer readable storage device of claim 16, wherein the first signal includes one or more of the first identifier of the data management device, the fourth identifier of the measurement collection node, the first position of the data management device.

18. The non-transitory computer readable storage device of claim 17, wherein the one or more values include one or more of the third identifier of the of the user equipment, a third position of the user equipment in the environment, a status of connections to a second network, a timestamp associated with the one or more values, a noise level associated with the connections to the second network, a signal strength associated with the connections to the second network, a signal-to-noise ratio associated with the connections to the second network, and pathloss associated with the connections to the second network.

19. The non-transitory computer readable storage device of claim 18, wherein the trigger event includes one or more of the status of connections indicating the user equipment is not connected to the second network, the noise level of the connections to the second network not satisfying a first threshold value, the signal strength associated with the connections to the second network not satisfying a second threshold, the signal-to-noise ratio associated with the connections to the second network not satisfying a third threshold, and the pathloss associated with the connections to the second network not satisfying a fourth threshold.

20. The non-transitory computer readable storage device of claim 18, wherein when the one or more values indicate that the first position of the data management device exceeds a threshold distance between the data management device and the discovery drone, the second signal to cause the discovery drone to transmit a fifth signal including the one or more values, the second identifier of the discovery drone, and the second position of the discovery drone in the environment to the measurement collection node.

21. The non-transitory computer readable storage device of claim 20, wherein the fifth signal is to cause the measurement collection node to transmit a sixth signal to the data management device, the sixth signal including the one or more values, the second identifier of the discovery drone, and the second position of the discovery drone in the environment.

22. A method comprising:
- transmitting, by executing an instruction with at least one processor, a first signal from a data management device to a discovery drone, the first signal to cause the discovery drone to discover user equipment in an environment, the user equipment outside of a first network including a first drone; and
- collecting at the data management device, by executing an instruction with the at least one processor, one or more values corresponding to the user equipment;
- in response to a trigger event corresponding to the one or more values, determining, by executing an instruction with the at least one processor, a first position of the first drone in the environment;
- transmitting, by executing an instruction with the at least one processor, a second signal to the first drone, the second signal to cause the first drone to regulate the first position to establish one or more connections between the user equipment and the first network; and
- wherein the first signal is to cause the discovery drone to:
    - navigate throughout the environment;
    - query user equipment in the environment via a discovery signal, the discovery signal including one or more of a request for the one or more values, a first identifier of the data management device, a second identifier of the discovery drone, a third identifier of the user equipment, a fourth identifier of a measurement collection node, a transmission power of the discovery signal, a first position of the data management device, and a second position of the discovery drone in the environment; and
    - transmit a fourth signal including the one or more values, the second identifier of the discovery drone, and the second position of the discovery drone in the environment to the data management device after disconnecting from the data management device.

23. The method of claim 22, wherein the first signal includes one or more of the first identifier of the data management device, the fourth identifier of the measurement collection node, the first position of the data management device.

24. The method of claim 23, wherein the one or more values include one or more of the third identifier of the of the user equipment, a third position of the user equipment in the environment, a status of connections to a second network, a timestamp associated with the one or more values, a noise level associated with the connections to the second network, a signal strength associated with the connections to the second network, a signal-to-noise ratio associated with the connections to the second network, and pathloss associated with the connections to the second network.

25. The method of claim 24, wherein the trigger event includes one or more of the status of connections indicating the user equipment is not connected to the second network, the noise level of the connections to the second network not satisfying a first threshold value, the signal strength associated with the connections to the second network not satisfying a second threshold, the signal-to-noise ratio associated with the connections to the second network not satisfying a third threshold, and the pathloss associated with the connections to the second network not satisfying a fourth threshold.

* * * * *